US012478545B2

(12) United States Patent
Smith et al.

(10) Patent No.: US 12,478,545 B2
(45) Date of Patent: Nov. 25, 2025

(54) THERMAL AND VIBROTACTILE HAPTIC ACTUATORS

(71) Applicant: EMBR Labs IP LLC, Boston, MA (US)

(72) Inventors: Matthew J. Smith, Somerville, MA (US); Kristen Warren, Cambridge, MA (US); Xuchen He, Malden, MA (US); Raja Rajcic, San Francisco, CA (US)

(73) Assignee: EMBR Labs IP LLC, Boston, MA (US)

( * ) Notice: Subject to any disclaimer, the term of this patent is extended or adjusted under 35 U.S.C. 154(b) by 802 days.

(21) Appl. No.: 17/418,079

(22) PCT Filed: Jan. 6, 2020

(86) PCT No.: PCT/US2020/012311
§ 371 (c)(1),
(2) Date: Jun. 24, 2021

(87) PCT Pub. No.: WO2020/146226
PCT Pub. Date: Jul. 16, 2020

(65) Prior Publication Data

US 2022/0096317 A1 Mar. 31, 2022

Related U.S. Application Data

(60) Provisional application No. 62/791,134, filed on Jan. 11, 2019.

(51) Int. Cl.
*A61H 23/00* (2006.01)

(52) U.S. Cl.
CPC ... *A61H 23/004* (2013.01); *A61H 2201/0207* (2013.01); *A61H 2201/0228* (2013.01);
(Continued)

(58) Field of Classification Search
CPC ........ A61F 7/007; A61H 23/02; A61H 23/004
See application file for complete search history.

(56) References Cited

U.S. PATENT DOCUMENTS 6,066,164 A * 5/2000 Macher .................... H05B 1/02 607/152
2004/0171970 A1* 9/2004 Schleuniger .............. A61F 7/02 601/3

(Continued)

FOREIGN PATENT DOCUMENTS

JP 2016-162060 A 9/2016
WO WO 2018/097008 A1 5/2018

OTHER PUBLICATIONS

International Search Report and Written Opinion for International Application No. PCT/US2020/012311, mailed Mar. 10, 2020.

*Primary Examiner* — Kendra D Carter
*Assistant Examiner* — Thomas W Greig
(74) *Attorney, Agent, or Firm* — Wolf, Greenfield & Sacks, P.C.

(57) ABSTRACT

Embodiments related to a haptic actuator for transmitting heat and/or mechanical vibrations to an adjacent surface are disclosed. The haptic actuator may include a heating membrane, one or more supports, and a body. The one or more supports may extend between the body and the heating membrane to physically separate the heating membrane from the body.

20 Claims, 11 Drawing Sheets

(52) U.S. Cl.
CPC .. *A61H 2201/16* (2013.01); *A61H 2201/5007* (2013.01); *A61H 2201/5082* (2013.01); *A61H 2230/06* (2013.01); *A61H 2230/50* (2013.01)

(56) References Cited

U.S. PATENT DOCUMENTS

| | | | | |
|---|---|---|---|---|
| 2006/0258962 | A1* | 11/2006 | Kopanic ............ | A61H 23/0263 601/57 |
| 2012/0022411 | A1* | 1/2012 | Wu ........................ | A61N 1/046 601/15 |
| 2013/0238042 | A1* | 9/2013 | Gildersleeve ...... | A61N 1/36021 607/104 |
| 2013/0304053 | A1* | 11/2013 | Nebrigic ............ | A61H 23/0263 606/33 |
| 2014/0007416 | A1 | 1/2014 | Lindley et al. | |
| 2014/0071079 | A1 | 3/2014 | Heubel et al. | |
| 2014/0128780 | A1 | 5/2014 | Kennedy et al. | |
| 2014/0288390 | A1* | 9/2014 | Hong ................. | A61B 5/02438 600/301 |
| 2015/0101788 | A1 | 4/2015 | Smith et al. | |
| 2017/0105869 | A1* | 4/2017 | Frangineas, Jr. ...... | A61B 18/02 |
| 2018/0042761 | A1* | 2/2018 | Smith ..................... | A61F 7/007 |
| 2018/0093106 | A1 | 4/2018 | Binnet et al. | |
| 2018/0280227 | A1* | 10/2018 | Quest ................... | G09B 19/003 |
| 2019/0278374 | A1* | 9/2019 | Sato .......................... | G06F 3/01 |

* cited by examiner

THERMAL AND VIBROTACTILE HAPTIC ACTUATORS

CROSS-REFERENCE TO RELATED APPLICATIONS

This application is a National Stage filing under 35 U.S.C. § 371 of international application serial number PCT/US2020/012311, filed on Jan. 6, 2020, which claims the benefit of priority under 35 U.S.C. § 119 (e) of U.S. provisional application Ser. No. 62/791,134, filed Jan. 11, 2019, the disclosures of each of which are incorporated by reference in their entirety.

FIELD

Disclosed embodiments are related to haptic actuators for transmitting heat and/or mechanical vibrations to an adjacent surface.

BACKGROUND

Wearable technology has become of great interest, enabled by the shrinking of sophisticated microelectronics, maturation of wireless communication, and increasing energy density of various battery chemistries. However, wearable technology to date has focused primarily on sensing and data collection. Haptic actuation (i.e., the generation of sensations related to the sense of touch including both tactile and thermal sensations) has been increasingly recognized as an impactful area for wearable and mobile technology.

SUMMARY

In one embodiment, a haptic actuator for transmitting heat and mechanical vibrations to an adjacent surface includes a heating membrane, one or more supports constructed and arranged to transmit mechanical vibrations to the heating membrane, and a body. An actuator is disposed in the body, and the actuator is constructed and arranged to apply mechanical vibrations to the one or more supports. The one or more supports physically separate and support the heating membrane relative to the body.

In another embodiment, a method for transmitting heat and mechanical vibrations to an adjacent surface includes heating the adjacent surface with a heating membrane and applying mechanical vibrations to one or more supports mechanically coupled to the heating membrane to transmit the mechanical vibrations to the adjacent surface.

In yet another embodiment, a haptic actuator for transmitting heat to an adjacent surface includes a body, a heating membrane, and one or more supports constructed and arranged to thermally isolate the heating membrane from the body. The heating membrane has a heat capacity per unit area between or equal to one of 0.002 J/(K·cm$^2$) and 0.2 J/(K·cm$^2$).

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1:
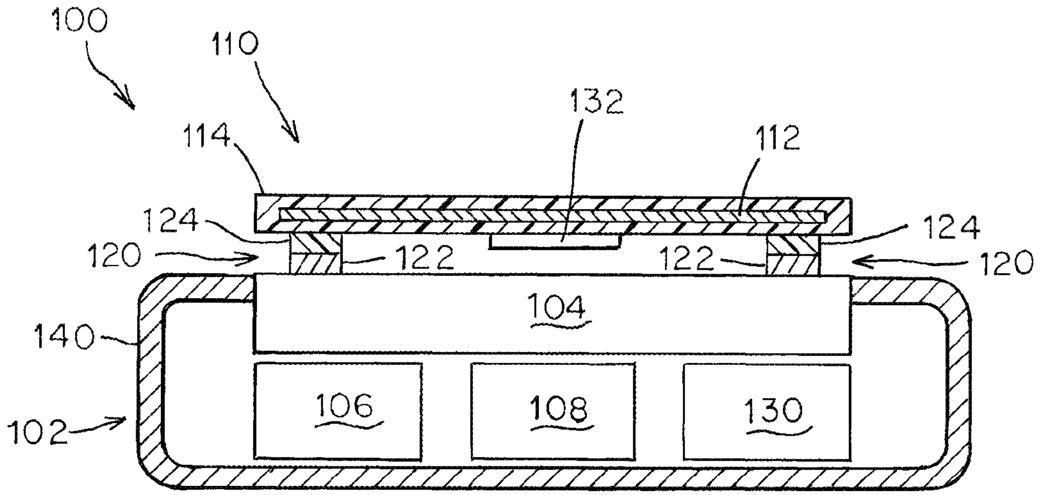
FIG. 1 is a cross-sectional schematic of one embodiment of a haptic actuator.

Conventional wearable technology for temperature control faces an array of technical challenges that limit or prevent the use of thermotactile actuation in current mobile and wearable technology. One such limitation is that wearable technology is most often powered by a wearable battery, which may significantly restrict power and energy available for operation of a haptic actuator. Despite this limitation conventional approaches to generating sensations of warmth are power intensive, and state-of-the-art solutions use large batteries or include a direct connection to an external power supply. Another limitation is that haptic actuation is typically done using close contact with the skin. Accordingly, typical actuators might provide temperature and vibrotactile sensations in different locations using separate actuators which may present packaging and size problems. Another technical challenge is that the effectiveness of a haptic actuation may depend largely on the location(s) of application as well as the control of the actuator which may affect how the subjective sensation is perceived by a user. Finally, making a wearable technology sufficiently lightweight and robust to be comfortably worn on the body in a range of environments may present additional packaging challenges.

To help aid implementation of a haptic actuator in various mobile applications, the Inventors have recognized that it may be desirable to provide a low weight and/or low-power system. Specifically, and without wishing to be bound by theory, the Inventors have recognized that heat capacity and thermal mass of a haptic actuator influences the power and energy used to heat an adjacent surface according to a desired temperature profile. That is, a haptic actuator with a higher heat capacity (i.e. thermal mass) may use more energy to heat an adjacent surface to a particular temperature than a haptic actuator with a lower heat capacity. Thus, a lower heat capacity of a haptic actuator may show reduced power consumption due to the corresponding lower amount of power used to heat the device when heating an adjacent surface according to a desired temperature.

In view of the above, the Inventors have recognized the benefits of a haptic actuator which includes a thermally isolated heating membrane (i.e., thermotactile actuator) that is at least partially thermally isolated from a body of the haptic actuator. More specifically, the Inventors have recognized the benefits of a low heat capacity heating membrane that is supported and at least partially thermally isolated from a body so that the thermal mass of the heated portion of the system remains low. Maintaining a relatively low thermal mass for the heating portion of a system may provide a relatively high efficiency heating of an adjacent surface with rapid response times. In one such embodiment, one or more supports may extend between a body of a haptic actuator and a heating membrane to support the heating membrane relative to the underlying body. These one or more supports may either be made from a thermally insulating material and/or have sufficiently thin cross sections such that the heating membrane is at least partially thermally isolated from a body of the haptic actuator.

In some embodiments, it may be desirable to apply heat and vibration at the same location. In such an embodiment, a haptic actuator may be constructed and arranged to apply a combination of haptic sensations, such as thermal sensations and vibrotactile sensations to an associated surface. For example, a heating membrane of a haptic actuator may be coupled to an actuator constructed to apply mechanical vibrations using the above noted one or more supports. The one or more supports may be directly or indirectly coupled to the actuator to transmit the applied mechanical vibrations. For example, the supports may extend out from an actuator supported within the body of a haptic actuator and/or the supports may extend out from a portion of the body connected to an actuator such that mechanical vibrations are transmitted from the actuator to the supports through the body. In either case, the one or more supports may also be constructed to be sufficiently rigid to support the heating membrane while transmitting vibrations from the vibrotactile actuator without permanently deforming. Thus, vibrations may be transmitted from the vibrotactile actuator through the supports to the heating membrane for applying vibrations to a surface adjacent the heating membrane. Such an arrangement may beneficially reduce the size of a haptic actuator while providing both thermal and vibrotactile stimulation to a surface while also maintaining a relatively high thermal efficiency for the system. Similar to the above, the heating membrane may still be at least partially thermally isolated from the actuator and an associated body of the haptic actuator. Accordingly, the haptic actuator may apply vibrations to an adjacent surface while maintaining a relatively low effective thermal mass for the heating membrane which may enable both rapid temperature changes as well as low power operation of the haptic actuator. Such an arrangement may also decrease an overall size of the system since the actuator and heating membrane may be aligned in some configurations.

As noted above, in some embodiments, a haptic actuator may include one or more supports that extend between a heating membrane and an associated actuator and/or other appropriate portion of a haptic actuator body. The supports may maintain the heating membrane in a spaced configuration relative to the actuator and/or haptic actuator body to at least partially thermally isolate the heating membrane. In some embodiments, the one or more supports may also create an air gap between the heating membrane and the body. The thermal isolation of the heating membrane may either be provided by a reduced surface area of the heating membrane being in contact with the supports and/or the supports being made at least partially from an insulating material and/or including an insulating material disposed between the heating membrane and the supports.

It should also be understood that the one or more supports may take any appropriate form that may be used to physically separate and thermally isolate the heating membrane from the body and/or actuator of a system, including, but not limited to, ribs, annular rings, fins, and columns. These structures may also have any appropriate shape including linear and curved arrangements as might occur with linear spaced apart ribs that extend between the heating membrane and a portion of the body of a system. The membrane supports may be arranged based on the desired level of thermal isolation and/or a desired amount and direction of flexibility of a heating membrane for ergonomic skin contact at a particular location. For example, additional flexibility in a middle portion of a membrane may be provided by supports located at an edge of the membrane.

In some embodiments, a haptic actuator may include a heating membrane with one or more heating elements disposed in the heating membrane. For example, the heating elements may be resistive heating elements corresponding to conductive material through which a current may be passed. The conductive material may then be resistively heated by the current to generate heat therein that is then conducted to an adjacent surface. The heating elements may be disposed in an electrically insulating layer of material such as a layer of dielectric material. Appropriate types of dielectric materials may include, but are not limited to polyimide, rubber, thermally conductive plastics, and silicone. In some embodiments, as noted above, the membrane may have a low heat capacity so that a reduced amount of energy may be used to heat the heating membrane itself during application of a desired temperature profile to a surface. In one such embodiment, a heating membrane may have a sufficiently small heat capacity such that a majority of the heat generated by the heating elements may be conducted to an adjacent surface in contact with the heating membrane instead of being used to heat the membrane itself and/or a body of the haptic actuator. Accordingly, the heating membrane may have a high efficiency when used to apply heat to an adjacent surface, as less wasted energy is used heating the membrane and haptic actuator.

While the current disclosure is primarily directed to the use of resistive heating elements, embodiments in which other types of heating elements are used including, for example, thermoelectric materials are also contemplated as the disclosure is not limited in this fashion.

It should be understood that the actuators disclosed herein to apply mechanical vibrations to an associated heating membrane of a haptic actuator may correspond to any appropriate type of actuator. For example, piezoelectric actuators, electrical solenoids, rotary motors with offset masses attached to an output shaft, linear resonant actuators, eccentric rotating mass vibration motors, and/or any other appropriate type of actuator capable of applying a mechanical vibration to a system may be used.

As used herein, the term “haptic” may refer to sensations relating to the sensation of touch which may include, but is not limited to, temperature sensations, vibrational sensations, pressure sensations, and textural sensations. Accordingly, a haptic actuator for applying haptic sensations to an adjacent surface (e.g., skin of a user) may provide one or more sensations relating to touch to the adjacent surface. For example, a haptic actuator may apply both thermotactile (i.e. temperature variations) and vibrotactile sensations (i.e. vibration and/or pressure changes) as well as any other appropriate type of sensation related to the sensation of touch, as the present disclosure is not so limited.

In some embodiments, it may be desirable to separately control a temperature applied to different regions of an adjacent surface. In such an embodiment, a heating membrane of a haptic actuator may incorporate a plurality of independently-operable heating elements and/or groups of heating elements, which may be referred to as thermal pixels. That is, the independently-operable heating elements may be used to selectively apply heat to different regions (i.e., thermal pixels) of an adjacent surface. For example, the heating elements may be arranged into separate elements and/or regions to form the thermal pixels which may allow independent temperature control of different portions of an adjacent surface. In some embodiments, the thermal pixels may be arranged in linear or planar arrays within a heating membrane to form a grid of thermal pixels. Of course, the thermal pixels may be arranged in any suitable pattern or relative position to one another, as the present disclosure is not so limited. The thermal pixels may be actuated individually, in selected groups, or all at once depending on the desired thermal sensation. For example, a plurality of independent thermal pixels may be actuated sequentially to apply heat to the skin of a wearer of a haptic actuator to simulate a warming sensation traveling across the skin of a user.

In some embodiments, a heating membrane of a haptic actuator may include one or more physiological sensors which may obtain information about a user. In one such embodiment, a sensor window may be formed in a heating membrane to permit a sensor aligned with and/or disposed in the sensor window to sense one or more physiological parameters of the user. For example, a sensor may be aligned with a hole and/or transparent portion of the heating membrane. Appropriate types of sensors that may be included in such an embodiment may include, but are not limited to, temperature, heat flux, galvanic skin response, heart rate, and blood oxygen saturation (SPO2) sensors. The information from these sensor(s) may be used to control one or more aspects of a haptic actuator based on feedback from the adjacent surface and/or the haptic actuator itself. The sensed physiological parameters may be used to determine a user state which may correspond to either a physiological and/or emotional state of the user. For example, physiological information may be used to determine stress levels, anxiety levels, temperature comfort level, exertion levels, the occurrence of particular conditions such as hot flashes, and any other appropriate type of physiological and/or emotional state of a user. In some instances, the user state(s) may then be used to modify control of the haptic actuator. For example, when it is determined that a user is experiencing high anxiety levels, the haptic actuator may be controlled to apply a calming sensation such as a slow rhythmic tactile sensation and/or a warming sensation to a wearer.

To help enable the accurate control of a temperature profile applied to a surface, in some embodiments, a haptic actuator may include one or more temperature sensors in thermal contact with a heating membrane. In some embodiments, the one or more temperature sensors may be integrated into, and/or may be thermally connected to, the one or more supports which are in thermal contact with the membrane. Alternatively, the temperature sensor may be in direct contact with the heating membrane as the disclosure is not so limited. A temperature signal provided by the one or more temperature sensors to an associated control of the haptic actuator may be used to enable a closed-loop control of the heating membrane, though other types of control schemes may also be used. Without wishing to be bound by theory, due to the relatively low effective heat capacity of the disclosed heating membranes and systems, small changes in skin temperature may be rapidly reflected in the temperature of the heating membrane. Therefore, the temperature of the heating membrane may be substantially equal to a temperature of the surface adjacent to the heating membrane when the heating membrane is not being heated. Thus, the temperature sensor may be used to monitor both the temperature of the heating membrane during operation and a skin temperature of a user when the heating membrane is not actively being heated.

In some embodiments, a heating membrane may include at least one thermal fuse and/or at least one heat flux sensor to further refine control of a heating membrane. The thermal fuse may be use to limit the temperature of the heating membrane during one or more operating states to provide a desired amount of thermal sensation during different situations. For example, if a wearer of the heating membrane was in a hot environment or hot from exertion such that a temperature of the heating membrane is greater than or equal to a threshold temperature, the heating membrane may be disabled from applying heat to the wearer. A heat flux sensor may be similarly used to determine cutoff points or limits for operation the heating membrane. For example, the heat flux sensor may be used to limit heat output to an adjacent surface to be less than or equal to a threshold heat flux. Alternatively, the heat flux sensor may be used to measure heat flux from the adjacent surface, and activate or deactivate the heating membrane based on the sensed heat flux. For example, a hot surface may have a positive heat flux from the adjacent surface (e.g., an overheated wearer) to the heating membrane. According to this example, a measured positive heat flux to the heating membrane may be used by an associated controller to deactivate the heating membrane.

Various operating and design parameters for a haptic actuator for controlling both thermal and vibration sensations applied to a user are detailed below. It should be understood that the various parameters may be used in any appropriate combination to provide the desired operating characteristics of a particular haptic actuator. However, should be understood that while particular values are given parameters both greater than and less than those noted above are also contemplated as the disclosures not so limited.

While a haptic actuator may apply sensations to any appropriate size area, in one embodiment, the surface area of a heating membrane may be greater than or equal to 0.1 $cm^2$, 0.5 $cm^2$, 1 $cm^2$, 5 $cm^2$, 10 $cm^2$, 25 $cm^2$, 50 $cm^2$, and/or any other appropriate surface area. Correspondingly, the surface area may be less than or equal to 100 $cm^2$, 80 $cm^2$, 60 $cm^2$, 30 $cm^2$, 15 $cm^2$, 7.5 $cm^2$, 2 $cm^2$, 0.75 $cm^2$, 0.2 $cm^2$, and/or any other appropriate surface area. Combinations of the above noted ranges are contemplated, including, but not limited to, surface areas between or equal to 0.1 $cm^2$ and 5 $cm^2$, 5 $cm^2$ and 15 $cm^2$, 15 $cm^2$ and 75 $cm^2$, 75 $cm^2$ and 100 $cm^2$, as well as 0.1 $cm^2$ and 100 $cm^2$. Of course, different combinations of the above described surface area ranges are also contemplated as well as surface areas greater than and less than those noted above as the present disclosure is not so limited.

Another design parameter relevant to haptic actuators with thermal pixels is the density of heating circuits per unit area. The density of thermal pixels may determine the spatial resolution for temperature profiles applied to a user. Further, without wishing to be bound by theory, thermal sensitivity varies widely across the body based on the density of warm thermoreceptors on the skin. The density of warm thermoreceptors on the body is typically between 0.3 and 1 thermoreceptors per $cm^2$. Accordingly, haptic actuators intended for use with different portions of a body may include different numbers of thermal pixels. For example, a haptic actuator positioned in a location with sparse thermoreceptors may have larger heating elements to generate equivalent subjective thermotactile sensations with lower spatial resolution. In contrast, a haptic actuator positioned in a location with dense thermoreceptors may have smaller, closely positioned heating elements to generate thermotactile sensations with higher spatial resolution. In one embodiment, the density of independent heating elements may be greater than or equal to 0.005 pixels/$cm^2$, 0.01 pixels/$cm^2$, 0.05 pixels/$cm^2$, 0.1 pixels/$cm^2$, 0.25 pixels/$cm^2$, 0.5 pixels/$cm^2$, 1 pixels/$cm^2$, and/or any other appropriate heating element density. Correspondingly, the independent heating elements be less than or equal to 1.5 pixels/$cm^2$, 0.75 pixels/$cm^2$, 0.3 pixels/$cm^2$, 0.15 pixels/$cm^2$, 0.075 pixels/$cm^2$, 0.02 pixels/$cm^2$, 0.0075 pixels/$cm^2$, and/or any other appropriate heating element density. Combinations of the above noted ranges are contemplated, including, but not limited to, heating element densities between or equal to 0.005 pixels/$cm^2$ and 1.5 pixels/$cm^2$, 0.1 pixels/$cm^2$ and 0.5 pixels/$cm^2$, 0.25 pixels/$cm^2$ and 1 pixels/$cm^2$, as well as 0.01 pixels/$cm^2$ and 1 pixels/$cm^2$. Of course, different combinations of the above described heating element density ranges as well as ranges both greater and less than those noted above are also contemplated as the present disclosure is not so limited.

In some embodiments, a total thickness of the heating membrane may be suitably thin so that there is limited thermal mass added by the membrane itself. Accordingly, a heating membrane may have a total thickness greater than or equal to 0.05 mm, 0.1 mm, 0.15 mm, 0.2 mm, 0.25 mm, 0.3 mm, 0.4 mm, and/or any other appropriate thickness. Correspondingly, the heating membrane may have a total thickness less than or equal to 0.5 mm, 0.35 mm, 0.25 mm, 0.20 mm, 0.175 mm, 0.125 mm, 0.075 mm, and/or any other appropriate thickness. Combinations of these thicknesses are contemplated including, for example, a thickness between or equal to 0.05 mm and 0.5 mm, 0.15 mm and 0.25 mm, 0.1 mm and 0.4 mm, as well as 0.1 mm and 0.3 mm. Of course it should be understood that other possible combinations of the above noted ranges, as well as ranges both greater than and less than those noted above, are also contemplated.

In some embodiments, the thickness of the heating membrane is much smaller relative to the transverse surface area which is used to contact an adjacent surface and conduct heat. Accordingly, such a heating membrane may have suitably low thermal mass (i.e. heat capacity) to be used efficiently for wearable haptic actuators. Of course, any suitable dimensions for the heating membrane may be employed as the present disclosure is not so limited. Several parameters useful for evaluating this performance are provided in detail below.

The one or more supports associated with a heating membrane may have any appropriate combination of dimensions to provide a desired amount of support and thermal isolation for a particular haptic actuator. However, in one embodiment the surface area of the supports in contact with a heating membrane may be a percentage of a surface area of the heating membrane which is less than or equal to 90%, 75%, 50%, 25%, 10%, 5%, 1%, and/or any other appropriate percentage of the heating membrane surface area. Correspondingly, the surface area of the supports in contact with the heating membrane may be a percentage of the surface area of the heating membrane which is greater than or equal to 1%, 3%, 10%, 15%, 30%, 60%, 75%, and/or any other appropriate percentage of the heating membrane surface area. Combinations of these ranges are contemplated including, for example, a surface area of the supports in contact with the heating membrane may have an area that is equal to a percentage of the surface area of the heating membrane that is between or equal to 15% and 50%, 5% and 30%, as well as 15% and 75%. Of course different combinations of the above ranges, as well as ranges both greater and smaller than those noted above, are also contemplated.

In some embodiments, it is desirable that a heating membrane is thermally isolated from a body of the haptic actuator and has a low heat capacity to provide low power thermal control. Without wishing to be bound by theory, if the heating membrane has poor thermal isolation or moderate heat capacity then generating dynamic temperature profiles may use significantly more power than is desirable in a wearable device. The role of thermal isolation and heat capacity may heavily influence haptic actuator performance and may be used to guide the design of thermal properties of a heating membrane. Without wishing to be bound by theory, one parameter for quantifying thermal efficiency of the haptic actuator may be a thermal coefficient of performance (COP), which may be defined as a ratio of the amount of heat conducted into an adjacent surface and the amount of power used by the heating membrane. A COP of 1 means the same amount of heat was delivered to the adjacent surface as power was provided to the haptic actuator, whereas a COP of 0.5 implies that half of the power delivered to the heating membrane was not applied to the adjacent surface. Thermal dissipation from a heating circuit is not directional and any conductive or convective channels for heat flow may reduce the COP of the membrane. For example, heat flow through the supports to an associated body of a haptic actuator would reduce the coefficient of performance. In this context, the measured COP of the device is a measure of the degree of thermal isolation of the membrane. Accordingly, increasing the thermal isolation of the membrane may increase the COP, thereby improving the effectiveness and efficiency of the haptic actuator.

In some embodiments, a haptic actuator may be controlled to apply a temperature profile to an adjacent surface. As discussed previously, poor thermal isolation directly increases power consumption to generate a given temperature profile, but there are also secondary effects to consider in the context of a temperature profile. In some embodiments, a temperature profile includes a thermostasis (i.e., cooling) period after a warmth (i.e., heating) period during which the thermal system is allowed to equilibrate and return to a desired temperature. Without wishing to be bound by theory, the lower the COP (i.e., the poorer the thermal isolation) the more energy is used to generate a temperature profile. That is, if a heating membrane is not thermally isolated or insulated from the rest of the system, the temperature of the entire system may be raised to achieve a particular temperature of the heating membrane. Correspondingly, more heat and energy input into the system results in more heat in the system that is dissipated during the thermostasis period. More specifically, as more heat is input into the system, the body or other structures of the haptic actuator may absorb the excess heat which is then dissipated during the thermostasis period to return the heating membrane and overall system to a desired temperature. Accordingly, reduced thermal isolation between a heating membrane and body of haptic actuator may result in decreased coefficients of performance and a longer thermostasis period between warmth periods.

In view of the above, a thermal coefficient of performance (COP) defined as the ratio between heat transferred to an adjacent surface and the power consumed to heat a heating membrane of the haptic actuator may be greater than or equal to 0.3, 0.4, 0.5, 0.6, 0.7, 0.8, and/or any other appropriate COP. Correspondingly the COP may be less than or equal to, 1, 0.95, 0.9, 0.8, 0.7, 0.6, 0.5, 0.4, 0.3, and/or any other appropriate COP. Combinations of the above noted ranges are contemplated, including, but not limited to, COPs between or equal to 0.3 and 1. Of course, different combinations of the above described COPs as well as COPs different than those noted above are also contemplated as the present disclosure is not so limited.

Another design parameter relevant to haptic actuators is a heat capacity per unit area of the heating membrane. The heat capacity per unit area may be suitably low such that the heating membrane may rapidly and efficiently apply heat to an adjacent surface without using excessive energy to heat the heating membrane itself. In one embodiment, the heat capacity per unit of a heating membrane may be greater than or equal to 0.001 $J/(K \cdot cm^2)$, 0.004 $J/(K \cdot cm^2)$, 0.01 $J/(K \cdot cm^2)$, 0.05 $J/(K \cdot cm^2)$, 0.075 $J/(K \cdot cm^2)$, 0.1 $J/(K \cdot cm^2)$, 0.125 $J/(K \cdot cm^2)$, 0.15 $J/(K \cdot cm^2)$, 0.3 $J/(K \cdot cm^2)$ and/or any other appropriate heat capacity per unit area. Correspondingly, the heat capacity per unit area of the heating membrane may be less than or equal to 0.5 $J/(K \cdot cm^2)$, 0.2 $J/(K \cdot cm^2)$, 0.14 $J/(K \cdot cm^2)$, 0.11 $J/(K \cdot cm^2)$, 0.09 $J/(K \cdot cm^2)$, 0.07 $J/(K \cdot cm^2)$, 0.04 $J/(K \cdot cm^2)$, 0.009 $J/(K \cdot cm^2)$, 0.003 $J/(K \cdot cm^2)$, and/or any other appropriate heat capacity per unit area. Combinations of the above noted ranges are contemplated, including, but not limited to, a heat capacity per unit area between or equal to 0.001 $J/(K \cdot cm^2)$ and 0.5 $J/(K \cdot cm^2)$, 0.01 $J/(K \cdot cm^2)$ and 0.05 $J/(K \cdot cm^2)$, as well as 0.075 $J/(K \cdot cm^2)$ and 0.5 $J/(K \cdot cm^2)$. Of course, different combinations of the above described heat capacity per unit area, as well as heat capacities per unit area both larger and smaller than those noted above, are also contemplated as the present disclosure is not so limited.

Without wishing to be bound by theory, a person's perception of temperature is a complex interaction of both absolute temperature, temperature difference relative to current skin temperature, and a rate of change of the temperature applied to the person's skin. Accordingly, when applying a temperature profile to a user that is intended to apply a thermal sensation, the applied temperature profile may include temperatures and rates of temperature change as detailed below. In one embodiment, the temperature may be greater than or equal to 20° C., 25° C., 30° C., 31° C., 35° C. and/or any other appropriate temperature. Correspondingly, the applied temperature may be less than or equal to 45° C., 40° C., 36° C., 35° C., 33° C., and/or any other appropriate temperature. Combinations of the above noted ranges are contemplated including, for example, temperatures applied to a user that are between or equal to 20° C. and 45° C., 20° C. and 40° C., 30° C. and 36° C., as well as 31° C. and 35° C., with a temperature of 36° C. being preferable in some embodiments. These temperature ranges may be combined with rates of temperature change applied to a user's skin that are greater than or equal to 0.01° C./s (Celsius per second), 0.05° C./s, 0.1° C./s, 0.2° C./s, 0.5° C./s, 1° C./s, 1.5° C./s, and/or any other appropriate rate of temperature change. Applied rates of temperature change may also be less than or equal to 2.0° C./s, 1.75° C./s, 1.25° C./s, 0.75° C./s, 0.3° C./s, 0.15° C./s, 0.075° C./s, and/or any other appropriate rate of temperature change. Combinations of these rates of temperature change are contemplated including, for example, a rate of temperature change between or equal to 0.01° C./s and 2.0° C./s, 0.05° C./s and 1° C./s, 0.1° C./s and 0.3° C./s, 0.01° C./s and 0.1° C./s, as well as 0.5° C./s and 2° C./s. Of course, different combinations of the above described temperature ranges and rates of temperature change, as well as ranges both greater than and less than those noted above, are also contemplated as the present disclosure is not so limited.

A passive cooling rate of a haptic actuator may be important for control and effectiveness of applying temperature profiles in quick succession while also avoiding thermal adaptation of a user. That is, the passive cooling rate of a heating membrane of the thermotactile actual may determine how often a temperature profile may be applied to the adjacent surface. As noted above, it may be desirable to allow a heating membrane of a haptic actuator to cool passively in an unpowered state to reduce the amount of power consumed by the haptic actuator during operation. In one embodiment, the heating membrane and associated supports disposed between the heating membrane and an associated portion of a haptic actuator body may be constructed appropriately such that the heating membrane cools with a desired rate of temperature change toward an initial temperature of the adjacent surface. For example, in cases where the adjacent surface is skin, the heating membrane and associated supports may cool from a temperature around 40° C. to a skin temperature between about 30° C. and 34° C. In another embodiment, the heating membrane and associated supports may cool from a temperature around 40° C. to a temperature between approximately 34° C. and 36° C. which may correspond to an upper limit for generation of a thermoneutral sensation for a user. In another embodiment, the heating membrane and associated supports may cool from a temperature around 40° C. to a temperature between 25° C. and 36° C., 30° C. and 36° C., and/or any other appropriate temperature range depending on the particular application. Of course, the heating membrane and associated supports may cool to any appropriate temperature based at least partly on the temperature of the adjacent surface, environmental conditions, and the applied temperature profile, as the present disclosure is not so limited. Additionally, embodiments in which the heating membranes do not cool to a particular temperature range are also contemplated as the disclosure is not limited in this fashion.

In some embodiments, the heating membrane and associated supports disposed between the heating membrane and an associated portion of a haptic actuator body may cool with a desired rate of temperature change toward the initial adjacent surface temperature under standard atmospheric conditions in an unpowered state. Standard atmospheric conditions may correspond to 1 atmosphere and 20° C. Under such conditions, the rate of temperature change may be a negative temperature change with a rate greater than or equal to 0.1° C./s, 0.25° C./s, 0.5° C./s, 0.75° C./s, 1° C./s, 1.5° C./s, 2° C./s, and/or any other appropriate cooling rate. Correspondingly, the rate of temperature change may be less than or equal to 2.5° C./s, 2.0° C./s, 1.75° C./s, 1.25° C./s, 0.9° C./s, 0.6° C./s, 0.4° C./s, 0.15° C./s, and/or any other appropriate cooling rate. Combinations of these rates of temperature change are contemplated including, for example, a rate of temperature change between or equal to 0.1° C./s and 2.0° C./s as well as 0.5° C./s and 2° C./s. Of course, different combinations of the above described temperature rates, as well as rates of temperature change both greater and less than those noted above, are also contemplated as the present disclosure is not so limited. In some embodiments, the above noted rates may occur when the heating membrane equilibrates towards a temperature between about 30° C. and 36° C. and/or any other appropriate range of temperatures as noted above.

The above noted temperature changes may be applied cyclically to a user. Accordingly, in some embodiments, the individual warmth and thermostasis (i.e. cooling) portions of a temperature profile may be applied for various durations. For example, the individual portions of a temperature profile may be applied for durations greater than or equal to 1 second, 2 seconds, 5 seconds, 15 seconds, 30 seconds, 1 minute, 2 minutes, 5 minutes, and/or any other appropriate time period. Correspondingly, the individual portions of temperature profile may be applied for durations less than or equal to 10 minutes, 5 minutes, 2 minutes, 1 minute, 30 seconds, 15 seconds, 5 seconds, 3 seconds and/or any other appropriate duration. Combinations of the above ranges are contemplated including, for example, durations for the individual thermal periods that are between or equal to 2 seconds and 15 seconds, 1 second and 5 seconds, 30 seconds and 2 minutes, 30 seconds and 10 minutes, and/or any other appropriate combination. Of course embodiments in which durations both greater than and less than those noted above are applied by a haptic actuator are also contemplated as the disclosure is not so limited.

The above noted rates of temperature change, as well as other rates of temperature change described herein, may either refer to an average rate of temperature change during a particular portion of a temperature profile when changing from a first temperature to a second temperature and/or they may refer to a temperature change rate that is applied during at least a portion of the applied temperature profile. For example, variable or constant temperature change rates may be applied when changing from a first temperature to a second temperature. Therefore, a particular rate may either be applied during at least a portion of the noted temperature change and/or the rate may correspond to an average rate during the noted temperature change.

In some embodiments, a haptic actuator and thermotactile control system provide energy-efficient generation of warming sensations in wearable form-factors using a low amount of power. Accordingly, when a haptic actuator applies a desired temperature profile to an adjacent surface, the haptic actuator may consume power during a warming portion of the thermal profile as detailed below. In one embodiment, the power consumed by thermotactile actuation during a warming portion of a temperature profile may be greater than or equal to 0.05 W, 0.1 W, 0.25 W, 0.5 W, 1 W, 2 W, 4 W, and/or are other appropriate power consumption. Correspondingly, the power consumed by thermotactile actuation may be less than or equal to 15 W, 10 W, 5 W, 3 W, 1 W, 0.75 W, 0.5 W, and/or any other appropriate power consumption. Combinations of the above noted ranges are contemplated including, for example, power consumption that is between or equal to 0.1 W and 1 W, 1 W and 5 W, 1 W and 10 W, as well as 1 W and 5 W with a power consumption of 5 W or less being preferable in some embodiments. Of course, any suitable amount of power may be consumed by a haptic actuator, including power rates both greater than and less than those noted above, as the present disclosure is not so limited.

In some embodiments, a haptic actuator may apply vibrations to an adjacent surface according to a particular vibrational profile. Without wishing to be bound by theory, particular vibrational patterns, frequencies, or amplitudes may be associated with a particular sensation or a wearer of the haptic actuator. Accordingly, the haptic actuator may vary the vibration applied to the adjacent surface using variations in amplitude, frequency, and/or pattern. For example, the actuator may apply mechanical vibrations to the adjacent surface using multiple pulses that may either be constant and/or may vary in regards to magnitude, frequency, and/or pulse rate. Of course, the vibration pulses may be applied in any suitable pattern, frequency, or amplitude, as the present disclosure is not so limited.

The haptic actuator may apply mechanical vibrations in a particular frequency range, which in some embodiments may be inaudible. In one embodiment, vibrations may be applied to an adjacent surface at a frequency greater than or equal to 1 Hz, 5 Hz, 10 Hz, 50 Hz, 100 Hz, 150 Hz, 200 Hz, 250 Hz, and/or any other appropriate frequency. Correspondingly, the vibrations may be applied at a frequency less than or equal to 300 Hz, 225 Hz, 175 Hz, 125 Hz, 75 Hz, 25 Hz, 7.5 Hz, 2.5 Hz, and/or any other suitable frequencies. Combinations of these frequencies are contemplated, including, for example, vibrational frequencies between or equal to 10 Hz and 200 Hz, 100 Hz and 200 Hz, 20 Hz and 350 Hz, as well as 1 Hz and 350 Hz. Of course, different combinations, as well as frequencies both greater than and less than those noted above, are also contemplated as the present disclosure is not so limited.

The haptic actuators may apply mechanical vibrations at a particular pulse rate which may correspond to a physiological parameter (e.g., heart rate) or other predetermined value. In one embodiment, the mechanical vibrations may be pulsed at a rate greater than or equal to 30 pulses/min, 40 pulses/min, 50 pulses/min, 60 pulses/min, 70 pulses/min, 80 pulses/min, and/or any other appropriate pulse rate. Correspondingly, the mechanical vibrations may be pulsed at a rate less than or equal to 120 pulses/min, 100 pulses/min, 85 pulses/min, 75 pulses/min, 65 pulses/min, 55 pulses/min, 45 pulses/min, and/or any other appropriate pulse rate. Combinations of these pulse rates are contemplated, including, for example, pulse rates between or equal to 30 pulses/min and 120 pulses/min, 40 pulses/min and 85 pulses/min, 50 pulses/min and 70 pulses/min, as well as 50 and 60 pulses/min. Of course, different combinations of the above described pulse rates, as well as pulse rates both greater and less in those noted above, are also contemplated as the present disclosure is not so limited.

In some embodiments, a haptic actuator and associated controller may be suitable for integration with other wearable technologies, other forms of sensory actuation, and/or with larger more complex systems through wired and/or wireless communication. In some embodiments the haptic actuator may be incorporated into a wearable article (e.g., an article of clothing). For example, in certain embodiments, a haptic actuator as described herein may be incorporated in a scarf, necklace, armband, wristband, hat, shirt, vest, pants, leggings, sleeves, headphones, ear buds, eyeglasses, goggles, or any other suitable wearable article capable of being worn on any appropriate portion of a person's body. The size of the haptic actuator may be selected, in some embodiments, such that the device fits comfortably on or around a wrist, an ankle, a head, a neck, a torso, an arm, a leg, a calf, an ear, a face and/or any other appropriate portion of a person's body. Additionally, embodiments in which a haptic actuator is not incorporated into a wearable article are also contemplated. For example, a haptic actuator may configured such that it may be applied manually by a person and/or may be incorporated into a separate stationary system. Accordingly, it should be understood that the currently disclosed haptic actuators are not limited to any particular form factor and/or size.

There are numerous applications for haptic actuators according to embodiments disclosed herein. Several non-limiting examples are provided below.

In some embodiments, a haptic actuator may be used to influence an affective state of a wearer. Without wishing to be bound by theory, it has been previously demonstrated that thermotactile actuation may be used to influence a person's affective state by leveraging psychophysiological associations between sensory experiences and emotional states. For example, warmth and vibration are both used to facilitate muscle relaxation. As another example, warmth may be applied to help a wearer cope with loneliness. Temperature profiles may also be applied to influence other affective states, such as applying fast heat pulses for energizing a wearer, slow heat pulses based on heart beat to calm a wearer, etc. In addition to thermal sensations, vibrotactile sensations can be used to calm or excite the wearer depending on the precise rhythm and pulse profiles used. Sensations of warmth may also influence the experience of social emotions (e.g., empathy, pride, loneliness, embarrassment, etc.).

In some embodiments, the independent heating elements may be used to relay information to a wearer of the haptic actuator through targeted temperature manipulation. For example, heating pulses from one heating element may be used to relay physiological information, provide haptic feedback for games or entertainment, or relay any other information useful to the wearer. Each heating element may be associated with a particular type of information, such that a message relayed by temperature profile is clear to a wearer. For example, a haptic actuator integrated with another wearable device may be used to provide notifications, alerts, and/or navigational cues that are inconspicuous and do not visually or aurally distract the user. Another application may be enhancing media with complementary haptic sensations for a more immersive or engaging experience for gaming or other entertainment. For example, a haptic actuator may be used to generating a more immersive gaming experience by adding haptic sensations that complement activity in the game.

In another possible application, a haptic actuator may measure a physiological state of a user and may provide biofeedback cues to the user based on the measured information to help guide the user into a desired physiological state. For example, the haptic actuator may provide feedback to a wearer to guide the wearer into a relaxation state (i.e., meditation).

In another embodiment, a wearable haptic actuator may be used to provide warmth for people with thermal discomfort. According to this embodiment, sensors monitoring the physiological state of a user may be used to predictively operate the actuators, providing the desired level of warmth when the environment changes. The haptic actuator may also incorporate physiological information that may indicate a wearer is uncomfortable and apply heat to the wearer in response.

In yet another embodiment, a controller of a haptic actuator may be designed to accept a wide range of potential inputs or cues for driving thermotactile actuation. The haptic actuator can be built into an external system that provides inputs or may be in wireless communication with other connected systems. For example, exemplary external systems may include as smartphones, personal computers, media equipment, physiological sensing systems, and other wearable technology (e.g., headphones, virtual reality goggles, augmented reality glasses, smart clothing, etc.). These systems may influence or modify control of the haptic actuator. For example, playing media through headphones may cause a cooperating haptic actuator to apply haptic sensations such as thermal and/or vibrotactile sensations to a wearer that are synced with the media. Thus, the haptic actuator may cooperate with any connected systems to supplement and/or enhance those system's features and/or operation.

Another example of a connected system may be a physiological sensing system on a wearer or on another person. The sensing system may be used to evaluate a psychophysiological condition of an individual which may be correlated with temperature profiles applied to the user. This can be applied as biofeedback by the haptic actuator, in which variations in the temperature profiles applied to the user may be correlated with an individual's state of relaxation or excitement. Physiologically-informed haptic actuation can also be used to convey an affective state of the user. This information may either be logged internally, output to a separate remotely located server, and/or communicated to a wirelessly and/or wire connected device. For instance, in some embodiments, a first haptic actuator may communicate a detected user state which may correspond to a physiological and or psychological state of the user to a second haptic actuator. The second haptic actuator may communicate the sensed state to a user of the second haptic actuator using either thermal and/or vibrotactile sensations. For example, a haptic actuator may convey to a wearer when a user of a connected haptic actuator is experiencing a particular affective state. Thermal and/or vibrotactile sensations may also be used to directly modulate the experience of emotions that warmth and slow tactile sensations have been shown to mitigate, such as feelings of loneliness or anxiety.

In another embodiment, a system either wirelessly or physically connected to a haptic actuator may be a smartphone which may cooperate with the haptic actuator to provide thermotactile cues to a user. Without wishing to be bound by theory, thermotactile cues may be a more inconspicuous form of notification than existing solutions that rely on visual, audio, or vibrotactile cues. Wearable haptic actuators may be paired with a smartphone or other computing device to provide temperature profiles based on the particular type of notification from the smart phone. For example, a haptic actuator may provide specific temperature profiles for notifications related to messaging, alarms, and/or navigational cues. Of course, a haptic actuator may provide any suitable haptic sensation to a wearer to provide a notification of a wearer of a desired event on connected computing device.

Turning again to entertainment systems such as a television, game console, or virtual reality system, a haptic actuator may be used to increase the engagement of a user experiencing various forms of media such as movies, television, video games, commercials, and/or music. In some embodiments, the media may be pre-encoded with haptic cues (e.g., temperature and/or vibration profiles) that are sent to the controller of a haptic actuator. These haptic cues may then be used to apply thermal and/or vibration sensations to a user. In other embodiments, the controller may process the media and generate temperature and/or vibration profiles that may be applied to a user by the haptic actuator. In embodiments in which a haptic actuator is used with a video game, the haptic actuator may be integrated into a hand held controller for the video game. Similarly, in some embodiments, haptic actuators may be placed in multiple locations across the body or integrated into a virtual reality headset to provide additional sensory inputs that can be used to create more immersive virtual reality experiences. For example, thermotactile actuation may be used to convey when the user is in a hot environment or interacting with a hot object in virtual reality. As another example, thermotactile actuation may be used to convey sensations relating to social interactions in virtual reality, such as social touch.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1 depicts a cross sectional view of an embodiment of a haptic actuator 100. The haptic actuator includes a body 102, a heating membrane 110, and a support in the form of an annular support ring 120 that is disposed between the body and the heating membrane. Depending on the particular embodiment, the support may either be integrally formed with the body or attached to the body using adhesives, welds, mechanical interlocking features, or any other attachment method. In either case, the support may extend outwards away from the body and may be connected to the heating membrane to support the heating membrane relative to the underlying portion of the body.

The heating membrane 110 may also include one or more resistive heating elements 112 disposed in a dielectric layer 114. In some embodiments, the dielectric may be a polyimide film (e.g., Kapton). Of course, the dielectric may be any suitable material with a suitably low heat capacity and electrical conductivity, as the present disclosure is not so limited. The resistive heating elements 112 may be formed of a conductive material and is arranged to generate heat when electric current is applied to the conductive material. As shown in FIG. 1, the haptic actuator may also include a temperature sensor 132 which may be arranged to measure the temperature of the heating membrane 110 for feedback control of the resistive heating elements 112. In some embodiments, the sensor may be disposed on a surface of the heating membrane, a support, and/or any other appropriate portion of a haptic actuator.

Figure 2:
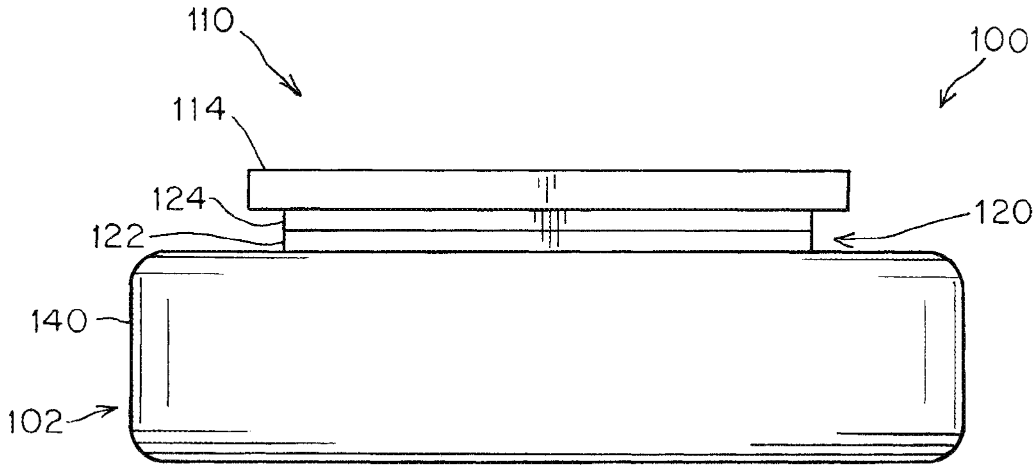
FIG. 2 is an exterior schematic of the haptic actuator of FIG. 1.

According to the embodiment shown in FIGS. 1-2, the body 102 may include a housing 140 and an actuator 104 disposed in the housing. The actuator may be adapted to generate mechanical vibrations. The actuator may either be coupled to the housing with the supports disposed between the housing and the heating membrane 110 and/or the actuator may be connected directly to the one or more supports 120 of a device. In either case, the actuator may generate vibrations that are either directly transmitted, or indirectly transmitted through the body/housing, to the one or more supports to transfer the vibrations to the associated heating membrane 110. For example, when the actuator 104 generates mechanical vibrations, the support 120 which is connected to and extends out from the actuator may transmit the mechanical vibrations to the heating membrane 110 connected to the one or more supports. Thus, the heating membrane may be placed in contact with a surface to apply both heat and mechanical vibrations to the surface.

In some embodiments, it may be desirable to provide a robust electrical connection to a heating membrane if it is to apply vibrotactile sensations to a surface. That is, in some cases, it may be desirable to ensure an electrical connection to a vibrating membrane so that electrical connectivity is not lost over repeated vibrational cycles. To provide a robust electrical connection, in one embodiment, a support 120 such as that shown in FIG. 1 may include one or more electrical connections to conduct power and/or signals between a controller 106 located within a body 102 and the heating membrane 110. The electrical connections may be located internal to the one or more supports, not depicted, and may allow for robust power and signal transmission between any electronic components in the heating membrane 110 (e.g., heating elements, sensors, etc.) and electronic components in the body 102.

FIGS. 1-2 illustrate one possible embodiment for thermally isolating a heating membrane 110 from a body 102 of a haptic actuator. In the depicted embodiment, a support 120 may at least partially thermally isolate the heating membrane 110 from the body 102 to limit an amount of heat transferred between the body and heating membrane. Without wishing to be bound by theory, the support may reduce conductive heat flux from the heating membrane to the body by reducing an area of the heating membrane in thermal contact with the body. For example, even if a conductive material were used for the support such that it may conduct heat to the body, the heat transfer may be limited by the smaller transverse surface area of the annular support that is in contact with the heating membrane as compared to an arrangement where the heating membrane is in direct contact with the body. Further as shown in FIGS. 1-2, the support 120 may also create an air gap between the actuator 104 and the heating membrane 110, providing additional conductive thermal isolation. Accordingly, the overall thermal mass of the haptic actuator may be reduced. Further, a majority of the heat generated by the heating membrane may be may be transferred to a desired surface adjacent to the heating membrane instead of to the body 102 which may allow the heating membrane to be used to apply both rapidly and efficiently heat the adjacent surface.

To further reduce the amount of heat transferred to a body 102 through the associated supports 120, in some embodiments, the one or more supports 120 may the at least partially made from an insulating material. In one such environment, as depicted in FIGS. 1-2, a support may include a thermally insulating material 124 disposed between a structural portion 122 of the support and the heating membrane. Alternatively, the support may be made entirely from a thermally insulating material. The insulating material may be any suitable insulating material, including, but not limited to, fiberglass, polyurethane foam, polystyrene, cellulose, polyethylene, polyethylene terephthalate, polyvinyl chloride, polypropylene, polylactic acid, polycarbonate, acrylic, polyoxymethylene, nylon, and acrylonitrile butadiene styrene. The insulating layer may further reduce the thermal conductivity of the support 120 and accordingly reduce the heat flux from the heating membrane to the body to increase heating efficiency of the heating membrane.

According to the embodiment shown in FIGS. 1-2, the haptic actuator may also include a controller 106 coupled to the heating membrane 110, a power source 108 coupled to the controller, and/or a sensor 130 disposed in the housing 140 and coupled to the controller. The sensor 130 may be a temperature sensor, accelerometer, gyroscope, position sensor, physiological sensor, or any other suitable sensor that may be used to provide the controller 106 additional information for controlling operation of the haptic actuator. The controller 106 may be constructed and arranged to control a current applied to a heating element 112 of the heating membrane 110 to generate a desired temperature profile. The controller may use information provided by the previously noted temperature sensor 132 for feedback control of the heating element to generate a desired temperature profile. The power source 108 may be a battery or any other appropriate form of portable power capable of supplying electrical power to the controller, sensors, and heating membrane. As discussed previously, in some embodiments, the controller, power source, and/or any other appropriate component may be electrically connected to the heating membrane 110 through the support 120. The electrical connection may be routed internally through the support 120 or may pass between the actuator 104 and heating membrane 110 in the opening inside of the annular support. The electrical connection may transfer signals, power, or any other suitable electrical current between the heating membrane and the body. Of course, the electrical connection may be arranged in any suitable manner to electrically connect components with the body and the heating membrane, as the present disclosure is not so limited.

FIGS. 3-8 depict schematic bottom views of various embodiments of a heating membrane 110 including at least one heating element 112 disposed within a supporting dielectric 114 layer or membrane which is coupled to one or more support(s) 120. The views are arranged such that the supports are extending into the page towards the depicted heating membranes.

Figure 3:
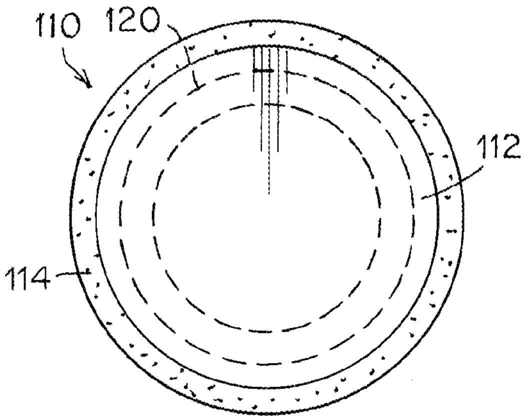
FIG. 3 depicts a schematic for one embodiment of a heating membrane and associated supports.

FIG. 3 depicts a circular heating membrane 110 including a circular heating element 120 with a first diameter surrounded by a dielectric 114. A single annular support with a second diameter that is less than the first diameter is concentrically arranged with an axis passing perpendicularly through a center of the heating membrane. Thus, the edges of the heating membrane 110 extend outwards from and are unsupported by the support. Accordingly, the edges of the heating membrane may be able to flex. Such an arrangement may allow the edges of the heating membrane to better conform to the shape of an adjacent surface. Additionally, such an arrangement may focus any vibrations transmitted through the support to a smaller area on the adjacent surface corresponding to the location of the support contact with the heating membrane, which may be desirable for some haptic sensations.

Figure 4:
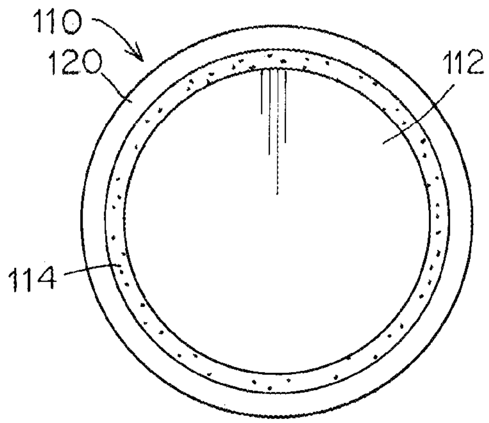
FIG. 4 depicts another schematic for one embodiment of a heating membrane and associated supports.

FIG. 4 depicts a circular heating membrane 110 with an annular support 120 disposed around an outer edge of the heating membrane. According to the embodiment shown in FIG. 4, the support is attached to the dielectric 114 of the heating membrane, with the heating element 112 radially separated from the annular support by the dielectric. Such an arrangement may provide additional thermal isolation of the heating membrane. That is, heat generated from the heating element 112 will travel through the thin dielectric layer prior to reaching the support 120, which may further reduce the conductive heat transfer rate between the heating element and a body coupled to an opposing end of the support. In the embodiment shown in FIG. 4, the connection of the annular support around the edge of the heating membrane may alter the flexibility or physical transmission of vibration through the heating membrane for particular applications. That is, the edges of the heating membrane 110 may be substantially rigid while the center of the heating membrane may be able to flex.

Figure 5:
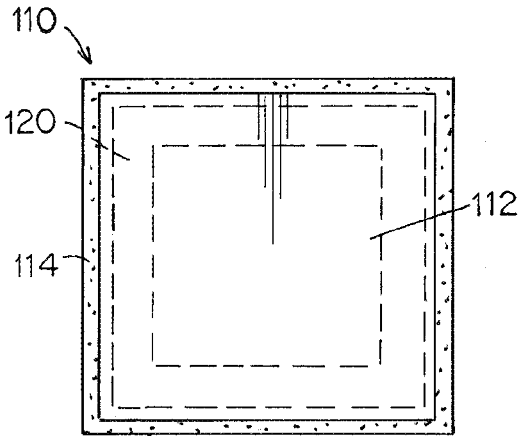
FIG. 5 depicts another schematic for one embodiment of a heating membrane and associated supports.

FIG. 5 depicts another embodiment of a heating membrane 110 similar to FIG. 3, but with a square shaped heating membrane. The heating membrane may also include a square heating element 112 disposed in a dielectric 114 similar to embodiments previously discussed. That square shape of the heating membrane may provide simplified packaging and manufacture of the heating membrane and support combination. Additionally, the square shape may provide additional surface area for a corresponding transverse dimensions (i.e., length and/or width) for haptic actuation as compared a circular membrane with the same transverse dimension. In the depicted embodiment, a square support 120 is disposed radially inside of the heating membrane such that it supports an internal portion of the heating membrane. Accordingly, the edges of the heating membrane 110 extend outwards from the support such that they are not directly supported by the support 120 and may be flexible. Again, such an arrangement may allow the heating membrane to better conform to the shape of an adjacent surface. Additionally, such an arrangement may focus any vibrations transmitted through the support to a smaller area on the adjacent surface, which may be desirable for some haptic sensations.

Figure 6:
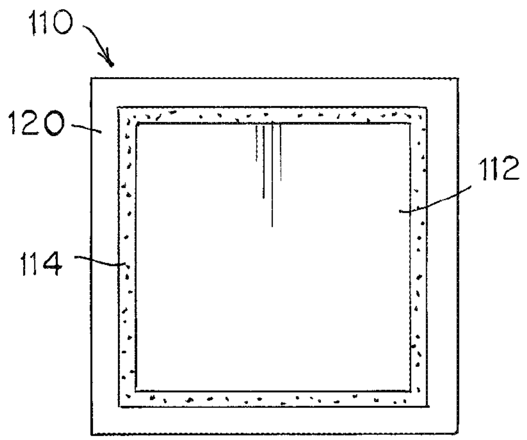
FIG. 6 depicts another schematic for one embodiment of a heating membrane and associated supports.

FIG. 6 depicts an embodiment of a heating membrane 110 and support 120 similar to that described above relative to FIG. 4. In the depicted embodiment, a square support 120 is disposed along and supports an outer edge of the heating membrane. The heating membrane and associated heating element 112 may extends between the opposing edges of the support such that the outer edges of the heating membrane are supported while a center of same heating membrane is permitted to deform.

Figure 7:
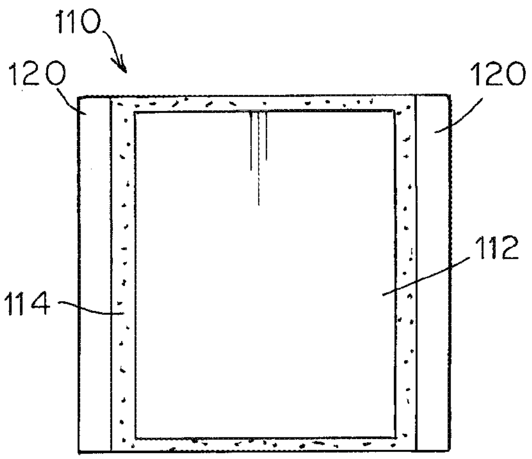
FIG. 7 depicts another schematic for one embodiment of a heating membrane and associated supports.

FIG. 7 depicts an embodiment of a square heating membrane 110 supported by side supports 120. The side supports 120 are linear supports disposed on opposite transverse sides of a heating membrane extending between the two supports. For example, a dielectric 114 surrounding a heating element 112 may be connected to the two opposing supports. Without wishing to be bound by theory, the side supports 120 may provide additional flexibility in a center of the heating membrane as there are less portions of the heating membrane rigidly mounted when compared to annular supports. Additionally, the side supports 120 may reduce the heat transfer from the heating membrane to a body of the haptic actuator the supports are connected to, as the overall transverse surface area of the supports may be reduced as compared with similarly sized annular supports. Accordingly, reduction of the transverse surface area may provide better heating efficiency of the heating membrane. In some embodiments, the side supports 120 may be arranged as thin fins, which may further reduce heat transfer from the heating membrane through the supports.

Figure 8:
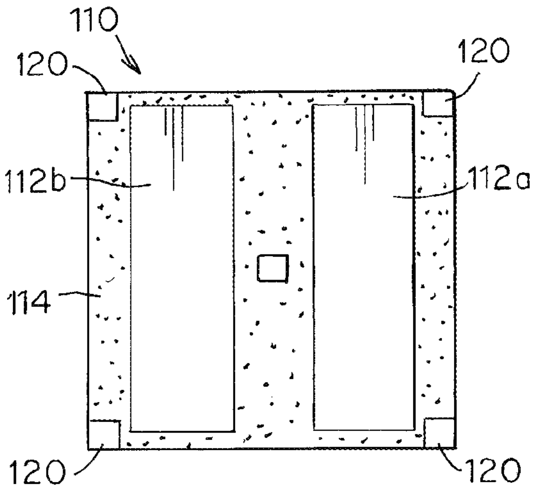
FIG. 8 depicts another schematic for one embodiment of a heating membrane and associated supports.

FIG. 8 depicts another embodiment of a square heating membrane 110. In the depicted embodiment, the heating membrane includes a first heating element 112*a* and a second heating element 112*b* that are separated from one another and disposed within the dielectric 114. Accordingly, the first heating element and second heating element may be used to apply heat to different regions of an adjacent surface. The heating membrane may also be supported by separate support columns 120 placed in the corners, center, and any other appropriate portion of the heating membrane. As shown in the figure, in some embodiments, the support columns may be positioned such that they contact portions of the heating membrane formed by the dielectric material. However, embodiments in which the support columns contact one or more portions of the heating membrane including a heating element are also contemplated. The above described arrangement may again improve thermal isolation by reducing the total contact area of the supports with the heating membrane while maintaining mechanical support and vibration transmission for the heating membrane.

In view of the above arrangements and variations, it should be understood that the supports may have any number of different arrangements and/or shapes. Accordingly, even though particular shapes such as circles, squares, line, and pin supports have been shown in the above embodiments, other appropriate types of shapes and arrangements contemplated as the disclosures not so limited. For example, other appropriate types of shapes for supports may include, but are not limited to, arcs, ovals, rectangles, triangles, stars, pentagons, hexagons, and/or any other appropriate shape and combination of shapes. Additionally, while individual isolated heating elements have been depicted in the figures, should be understood that each of the depicted heating elements may correspond to an array of heating elements and/or pixels as the disclosure is not limited in this fashion.

Figure 9:
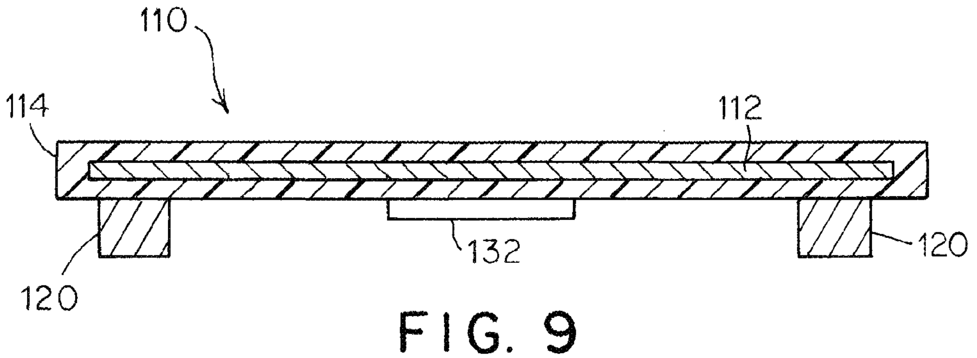
FIG. 9 is a schematic of another embodiment for a heating membrane and supports.

FIG. 9 is a side cross sectional view of an embodiment of a heating membrane 110 and associated one or more supports 120 of a haptic actuator. Similar to previously described embodiments, the heating membrane includes a heating element 112 disposed in a dielectric layer 114. A temperature sensor 132 is mounted to a portion of the heating membrane on a side opposite from an external side of the heating membrane. The sensor may be adapted to provide feedback information (e.g. surface and/or heating membrane temperature) to a controller (not shown in the figure) that supplies power to the heating element to heat the heating membrane. The support 120 prevents substantial conductive heat losses from the heating membrane on the side not in contact with the surface. As shown in FIG. 9, the support 120 is formed of a single layer, which may be any suitable insulating or non-insulating material. Without wishing to be bound by theory, the reduced transverse surface area of the support 120, as compared to the heating membrane and underlying portion of a haptic actuator's body, may at least partially thermally isolate the heating membrane. Accordingly, the support 120 may be any suitable material that may mechanically couple the heating membrane to a body so that vibrations may be transmitted from the body to the heating membrane.

Figure 10:
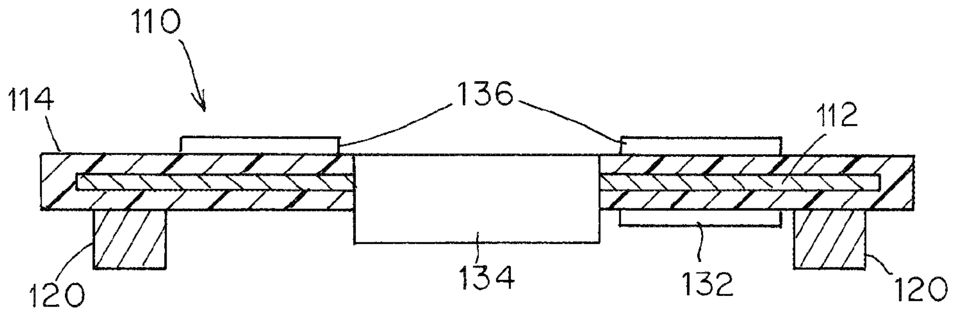
FIG. 10 is a schematic of another embodiment for a heating membrane and supports.

FIG. 10 is a side cross sectional view of another embodiment of a heating membrane 110 and support 120 of a haptic actuator. The depicted heating membrane includes a heating element 112 disposed in dielectric 114 similar to previously discussed embodiments. The heating membrane is also supported by one or more supports 120. In contrast to previously discussed embodiments, the heating membrane may also include a sensor window, such as a hole that passes through the heating membrane and/or a transparent portion of the membrane. The sensor window may be sized and shaped to accommodate an optical sensor 134, or any other appropriate type sensor, which may be disposed within the sensor window. For example, in some embodiments, the optical sensor 134 may be disposed flush with the top of heating membrane 110 or may be recessed beneath the membrane. In another embodiment, the optical sensor may be disposed beneath the heating membrane and the membrane may include a transparent window such that optical information may be received by the sensor from the adjacent surface. In some embodiments, the optical sensor may be used to detect physiological information of the wearer. According to one embodiment, any optical sensor may be used that uses non-contact optical spectroscopy to extract physiological information such as physiological information related to the circulatory system. For example, optical sensors may be used to measure temperature, photoplethysmography (i.e., heart rate), and blood oxygen saturation levels, or any other characteristic of an adjacent surface.

In some embodiments, the information measured by the above noted sensor may be used to at least partially control operation of a haptic actuator. For example, in one specific embodiment, a sensor may be used to monitor a heart rate of a user. Since an elevated heart rate may be indicative of stress, a controller of a haptic actuator may cause the haptic actuator to apply calming slow pulses of vibrotactile feedback to a wearer in response to a detected heart rate above a threshold heart rate to influence the affective state of a wearer.

In some embodiments, conductive pads 136 may be disposed on an exterior surface of the heating membrane such that the conductive pads may be placed in contact with the adjacent surface while the heating membrane conducts heat to the adjacent surface. The conductive pads may be used to measure galvanic skin response, apply electrical stimuli, and/or perform any other desirable function. In some embodiments, additional sensors or devices may be integrated into the heating membrane to gather information about the adjacent surface or otherwise perform a desirable function on the adjacent surface as the disclosure is not limited in this fashion.

As noted above, in some embodiments, the conductive pads 136 may be used to measure galvanic skin response (GSR). Without wishing to be bound by theory, GSR is a measurement of electrodermal activity which is a useful physiological signal of stress levels. GSR typically uses precise measurement of the conductivity of the skin through multiple contact points. The contact points may be integrated into the membrane 110 as exposed conductive pads on the surface such that they make contact with the skin of a wearer when being worn. GSR may be used to control the haptic actuator. For example, if a high stress level is sensed using GSR, such as a GSR signal greater than a threshold signal, the haptic actuator may apply a soothing temperature profile and/or vibrotactile actuation to influence the affective state of the wearer.

In another embodiment, the conductive pads 136 may be used to provide electrostimulation to the skin of a wearer. The electrostimulation may be localized based on the position of the conductive pads to generate a particular haptic sensation for the wearer. Electrostimulation can be used for a range of established therapeutic applications, including pain relief and behavior change. Electrostimulation may also be applied as a haptic actuator for media and entertainment purposes. Electrostimulation may be applied to an adjacent surface in combination or independent of thermal actuation and vibrotactile actuation to create any desirable haptic sensation.

In some embodiments, the membrane architecture of FIG. 10 may be conducive to the integration of additional functionality, including but not limited to other types of physiological sensors and other types of haptic actuation to improve packaging of wearable devices. As discussed previously, wearable technology may compete for limited space on the body of the wearer. With particularity to haptic actuators, the surface area effective for thermotactile actuation is determined by the density of thermoreceptors on the skin. Accordingly, a haptic actuator may be sized based on the density of thermoreceptors in a predetermined part of the body to apply effective haptic actuations. Thus, integration of various other components into the heating membrane may provide additional functionality without occupying significant extra space on the body of the wearer or modifying the effective size of a haptic actuator in certain applications.

Figure 11:
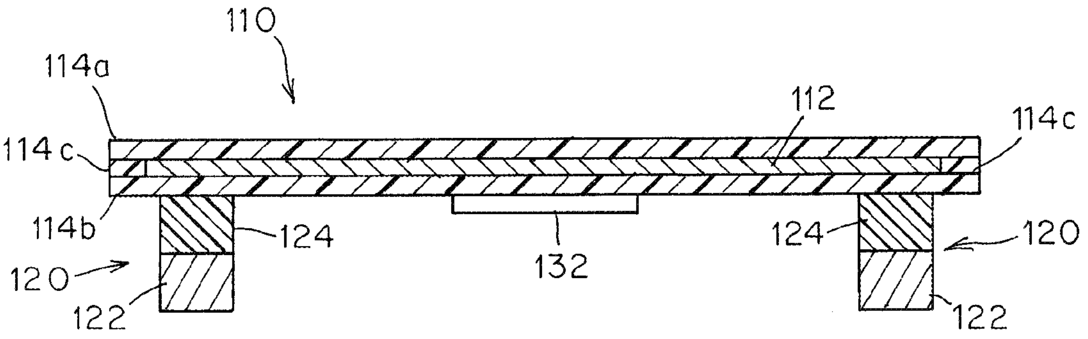
FIG. 11 is a schematic of another embodiment for a heating membrane and supports.

FIG. 11 is a side cross sectional view of a heating membrane 110 and support 120. As shown in FIG. 11, the heating membrane includes a heating element 112 disposed in a dielectric separated into a top layer 114*a*, a bottom layer 114*b*, and a side layer 114*c*. The separate layers may simplify manufacturing of the heating membrane and may provide a more modular approach to encapsulating the heating element 112 in the dielectric. Of course, the dielectric may be split into any suitable number of layers and/or the heating element may simply be encapsulated in a single integral layer of material, as the present disclosure is not so limited. Similar to previously discussed embodiments, the support 120 may include an insulating material 124 that is in contact with the heating membrane.

Figure 12:
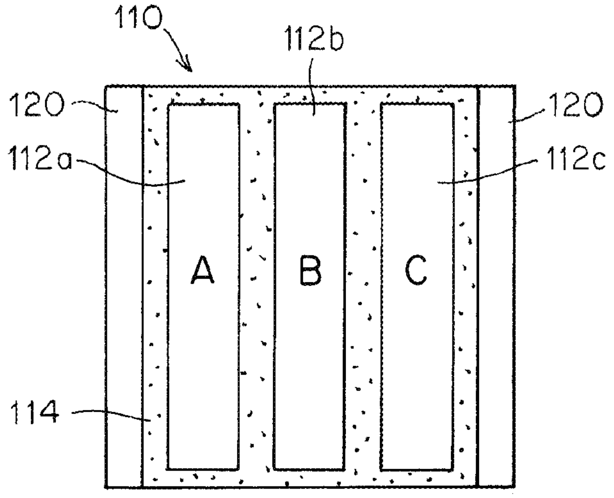
FIG. 12 depicts a schematic for an embodiments of a heating membrane and supports.
Figure 13:
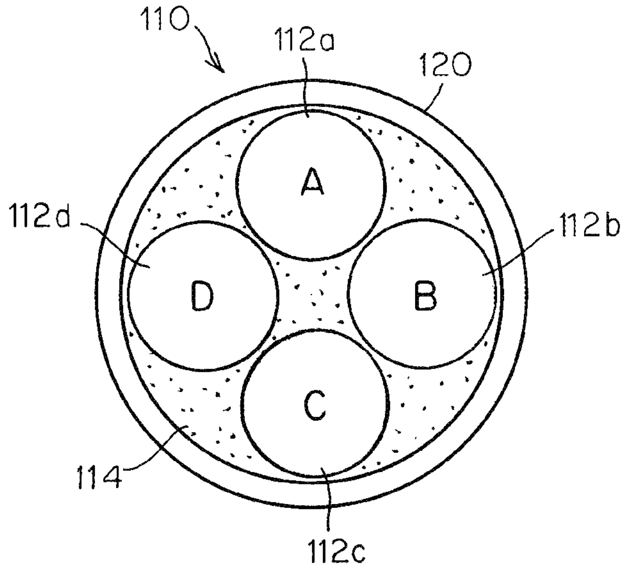
FIG. 13 depicts a schematic for an embodiments of a heating membrane and supports

FIGS. 12-13 depict embodiments of a heating membrane 110 including multiple heating elements 112 which may be used as thermal pixels to apply spatially targeted heat to an adjacent surface. FIG. 12 depicts an embodiment of a square heating membrane 110 including three heating elements 112*a*, 112*b*, 112*c*. The heating elements may be disposed in a dielectric which is supported on each end by supports 120. The heating elements may be heated individually or in combination such that a plurality of individually controlled temperature profiles may be generated across the surface of the heating membrane. As shown in FIG. 13, the heating elements 112*a*, 112*b*, 112*c* are arranged in a linear array across the heating membrane 110. Accordingly, the heating membrane may be used to apply linear temperature profiles to an adjacent surface. For example, the temperature profiles may simulate stroking or other progressive linear sensations of touch.

FIG. 13 depicts an embodiment of a circular heating membrane 110 including four heating elements 112*a*, 112*b*, 112*c*, 112*d* arranged in a square pattern. Similar to the embodiment of FIG. 12, the heating elements are disposed in a dielectric 114 which is supported on the edges of the membrane by an annular support 120. As above, the four heating elements may be individually controlled to provide a desirable temperature profile in time and space across the membrane. As shown in FIG. 13, the heating elements 112*a*, 112*b*, 112*c*, 112*d* may be arranged in a grid which may be used to apply temperature profiles progressively in different directions. For example, the heating elements may be used to apply temperature profiles in a circular direction by actuating heating elements 112*a*, 112*b*, 112*c*, and 112*d* in that order. Of course, the heating elements may be actuated in any suitable pattern or direction, as the present disclosure is not so limited.

While several embodiments in which different numbers and arrangements of heating elements, i.e. thermal pixels are depicted in the figures and described above, the current disclosure is meant to encompass any number of different heating elements and arrangements. For example, a heating membrane may include an array of heating elements arranged in rows and columns in any number of different shapes. Accordingly, the current disclosure should not be limited to only the heating membranes shown in the figures.

Figure 14:
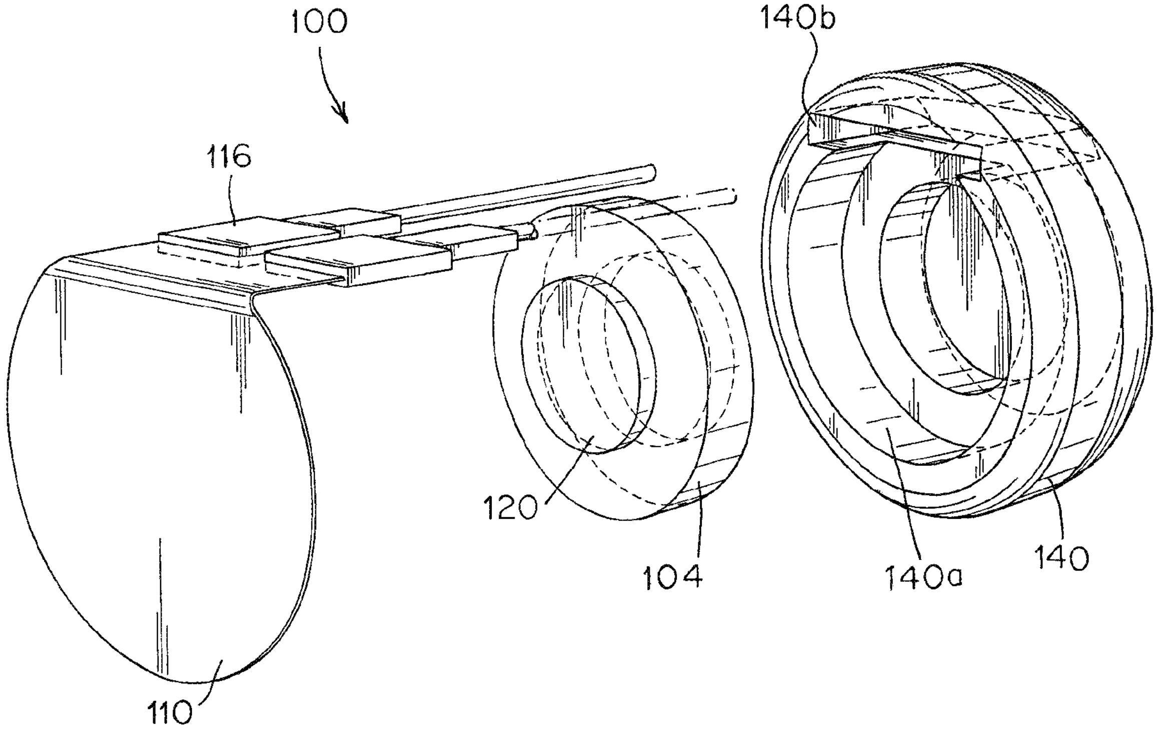
FIG. 14 is an exploded view of another embodiment of a haptic actuator.

FIG. 14 depicts an exploded view of one embodiment of a haptic actuator 100. The haptic actuator includes a heating membrane 110, a support 120, and a housing 140 including an actuator 104 disposed therein. The actuator 104 is constructed to generate vibrations within a desired frequency range. The heating membrane includes a heating element (not shown in the figure) which is constructed and arranged to heat the heating membrane to conduct heat to an adjacent surface. In some embodiments, the heating element may be disposed in a polyimide film (e.g., Kapton) which electrically insulates the heating element. The heating element is powered by contacts 116 which may extend in a perpendicular direction away from the heating membrane. The contacts may be used to pass a current through the heating element to generate resistive heat. The planar portion of the heating membrane including the heating element may be configured be disposed on and coupled to one or more supports 120. In this particular embodiment, the support is an annular support with a diameter that is less than a diameter, or other transverse dimension, of the heating membrane. The annular support also extends outward away from an outer surface of the actuator such that it is disposed between the heating membrane and the actuator.

The actuator 104 may be sized and shaped to be disposed within a cavity 140*a* formed in the housing 140. The contacts 116 and associated leads may extend through an electrical passage through 140*b* formed in the housing such that the leads may be connected to an appropriate power source and/or controller. Thus, the assembled haptic actuator may include a heating membrane 110 supported above the surface of the actuator. In some embodiments, the edges of the heating membrane may overlay at least a portion of the housing exterior around a periphery of the cavity in which the actuator is disposed. This may help to support the edges of the heating membrane. As above, the support may be constructed to have sufficient stiffness to also transmit vibrations generated by the actuator to the heating membrane so that the vibrations may be transmitted to an adjacent surface in contact with the heating membrane. Also, similar to the prior described embodiments, the above construction may help to physically separate and creates an air gap between the heating membrane and the actuator as well as the housing. As the contact area between the heating membrane and support, as well as the contact area between the edges of the heating membrane and the housing, is significantly less than a surface area of the heating membrane itself, the heating membrane may be thermally isolated from both the actuator and housing of the haptic actuator. Accordingly, an effective thermal mass of the haptic actuator 100 may be reduced during operation as compared to more typical systems while also providing vibrotactile stimulation to a surface the heating membrane is in contact with.

The actuator, heating membrane, support, and housing may be connected to each other in any appropriate fashion. For example, appropriate attachment methods may include the use of adhesives, mechanically interlocking components, fasteners, and/or any other suitable method for connecting the one or more components of the system. Additionally while the components have been depicted as separate assembled components, embodiments in which one or more components are integrally formed with one another are also contemplated.

Figure 15:
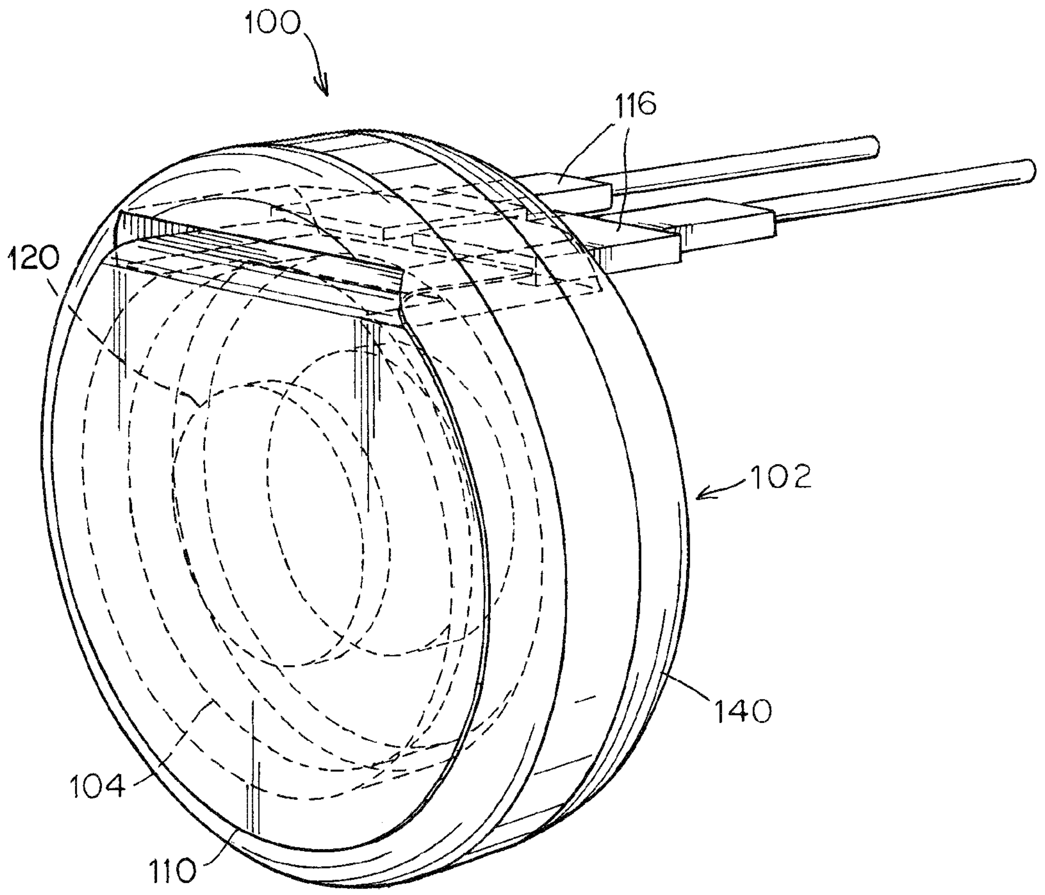
FIG. 15 is a perspective view of the haptic actuator of FIG. 16.
Figure 16:
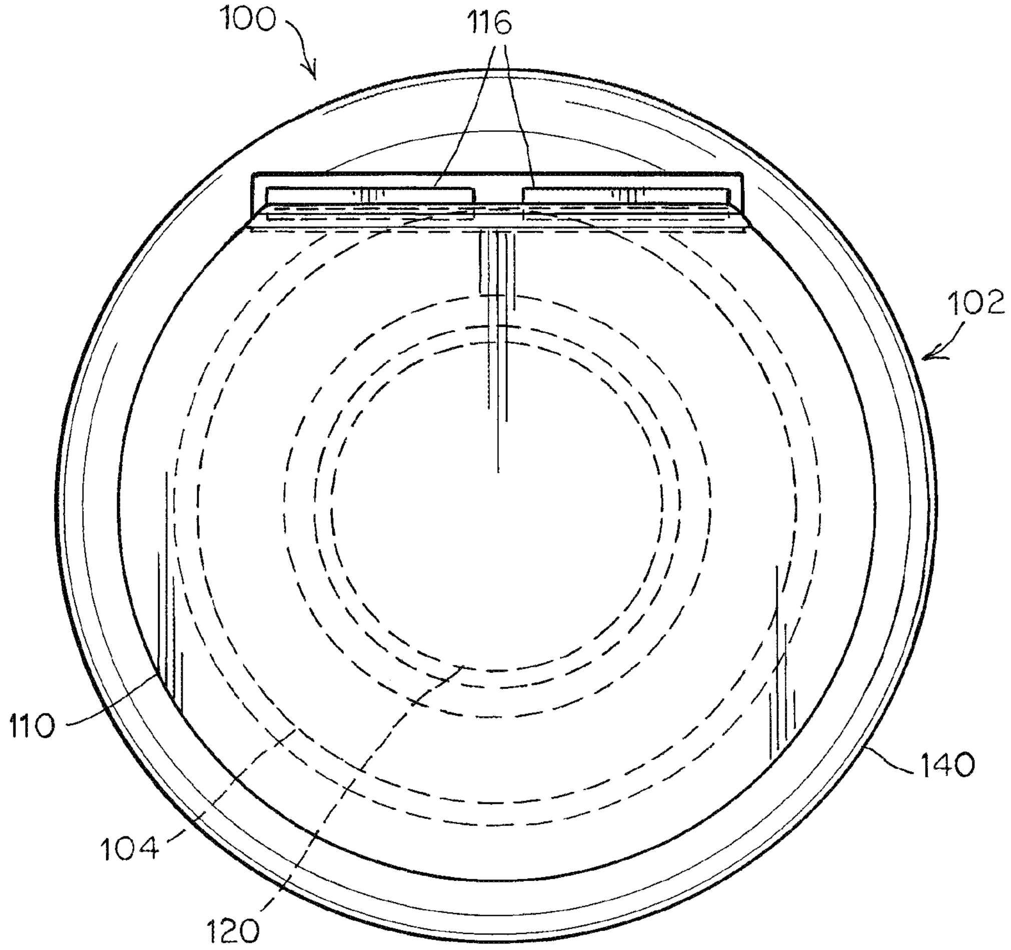
FIG. 16 is a top view of the haptic actuator of FIG. 16.

FIGS. 15 and 16 depict a perspective and top view of the haptic actuator 100 of FIG. 14 with the heating membrane 110, support 120, and actuator 104 assembled. When assembled, the heating membrane and actuator may occupy a transverse surface area similar to that occupied by each device independently. This illustrates the compact construction of a wearable haptic actuator capable of providing both heat and vibration to an adjacent surface in contact with the heating membrane.

Figure 17:
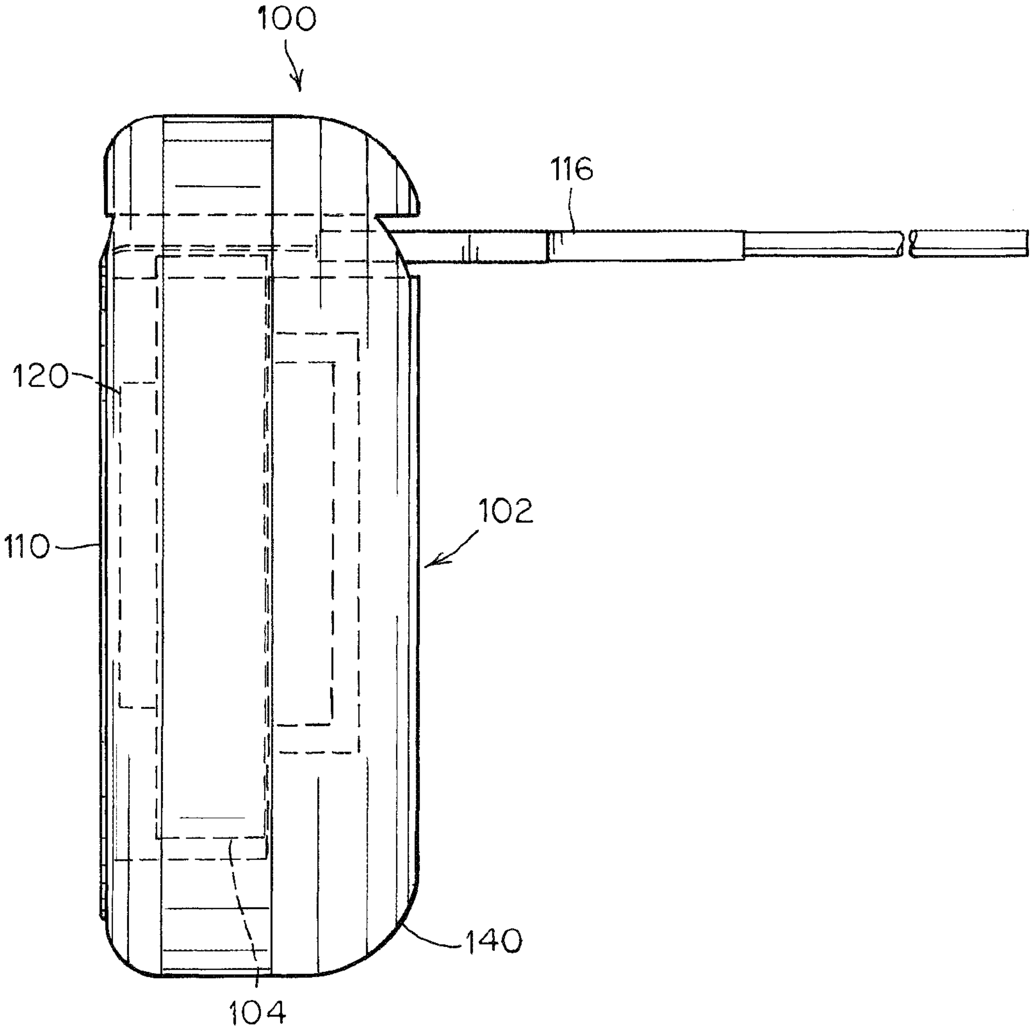
FIG. 17 is a side view of the haptic actuator of FIG. 16.

FIG. 17 depicts a side view of the haptic actuator 100 of FIG. 14. As discussed previously, the support 120 creates an air gap between the heating membrane 110 and actuator 104. As shown in the figure, the air gap between the heating membrane and actuator may occupy a relatively small portion of the device thickness while still providing effective thermal isolation. Without wishing to be bound by theory, relatively short supports, and correspondingly small air gaps, may be more rigid than long thin supports. This may provide better rigidity and vibration transmission between the actuator and the heating membrane as the support due to reduced buckling and other deformation modes of the support.

Figure 18A:
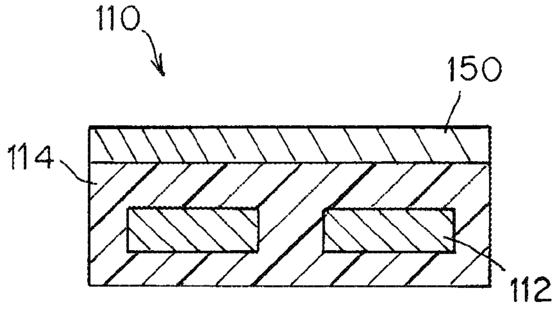
FIG. 18A is a schematic cross-sectional view of a heating membrane including planar heating elements disposed in a planar dielectric material.
Figure 18B:
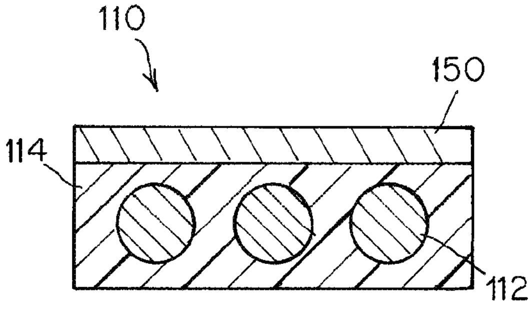
FIG. 18B is a schematic cross-sectional view of the heating membrane including circular heating elements disposed in a planar dielectric material.
Figure 18C:
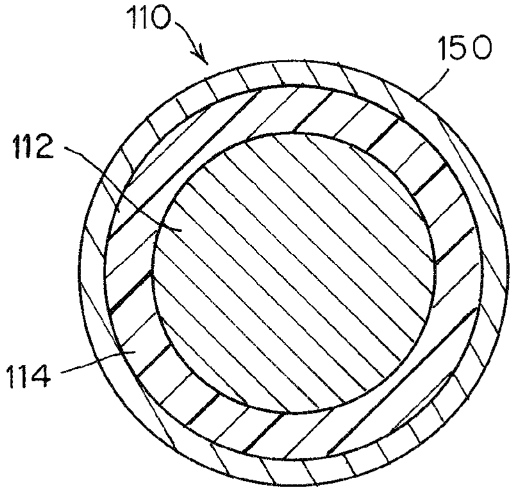
FIG. 18C is a schematic cross-sectional view of a heating membrane including a resistive heating wire coated with a dielectric material that may be woven into a heating membrane.

FIGS. 18A-18C depict different types of heating membrane 110 constructions that may be used. As shown in 18A, one or more planar conductive heating elements 112 may be disposed within a surrounding dielectric material 114. This may either be accomplished through encapsulation, a layered construction wherein the heating elements are disposed between opposing layers of dielectric material, and/or any other appropriate construction. In some embodiments, the heating membrane may include an interface material 150 disposed on an exterior side of the membrane. The interface material may be selected to improve the comfort associated with placing the heating membrane in contact with a user's skin. Appropriate types of material may include, but are not limited to, fabrics, plastics, metal film, foam, real or fake fur, and/or an adhesive patch. As shown in FIG. 18B, the heating elements may also be provided in the form of wires with circular cross sections disposed within the dielectric material. Alternatively, in some embodiments as shown in FIG. 18C, a heating element 112 might be provided in the form of a resistive heating wire that is coated with a dielectric material 114, and which may also optionally include an interface material 150 coated on the dielectric material. The coated heating wire may then be woven into a desired heating membrane which may then be integrated into the haptic actuator designs disclosed herein.

While specific examples of heating membrane constructions are provided above, should be understood that the current disclosure is not limited to any particular construction and/or method of forming a heating membrane.

Figure 19A:
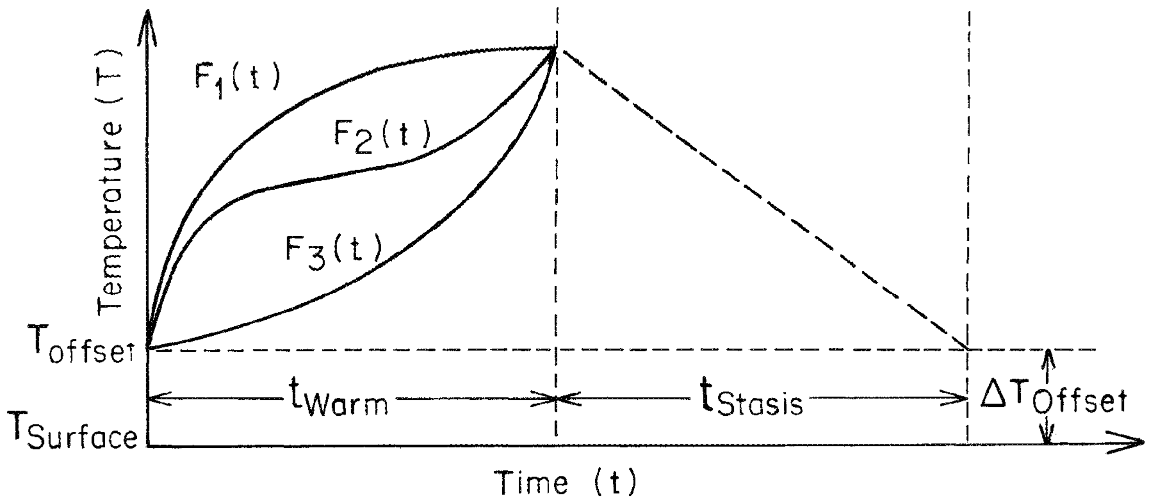
FIG. 19A is a graph showing an embodiment of a method for controlling a temperature of a haptic actuator.
Figure 19B:
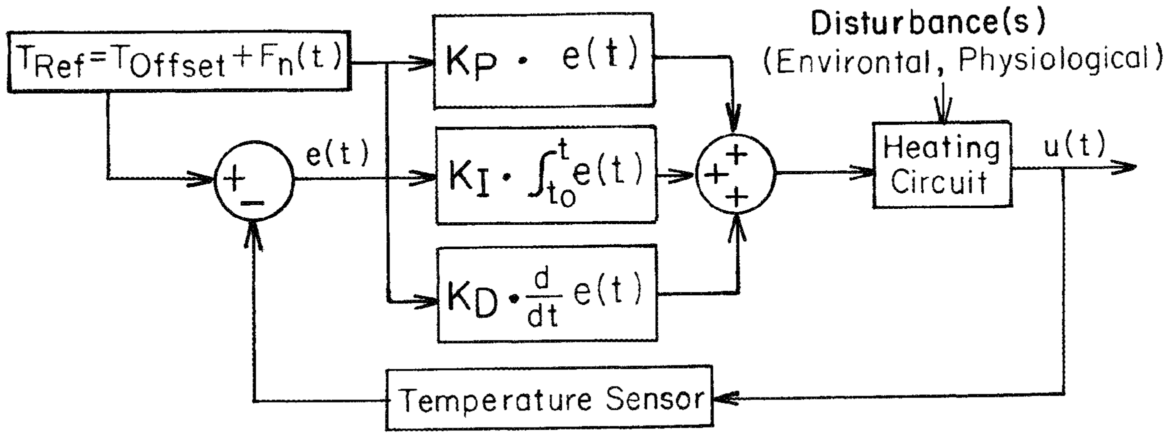
FIG. 19B is a diagram showing one embodiment of a controller for controlling a temperature of a haptic actuator.

FIGS. 19A-19B depict a graph showing one method for controlling a haptic actuator including a heating membrane and a diagram of a controller for performing the method, respectively. Specifically, the depicted method includes a warming period $t_{warm}$ during which the heating membrane is powered to heat an adjacent surface, and a cooling or stasis period during which the low thermal mass system is permitted to cool. As elaborated on below, these varying temperatures applied to a surface may help to avoid thermal adaptation of a user and the low thermal masses of the system may enable both the rapid control of the applied temperature while also minimizing power consumption.

FIG. 19A, shows a diagram of the different portions of a heating membrane control process to apply a desired temperature profile. The temperature profile is split into two parts: a warmth period during which heat is generated by the heating membrane and conducted to an associated surface the heating membrane is in contact with. The temperature may increase from either an initial surface temperature $T_{Surface}$ and/or an offset temperature $T_{Offset}$ that is greater than the initial temperature. The temperature profile may follow any number of different temperature profiles during the warming period as illustrated by temperature profiles $F_1$, $F_2$, and $F_3$. The temperature profiles may be selected to provide a desired combination of absolute temperatures, rates of temperature change, and/or any other desired operating parameter. After applying the desired warmth period, a controller of the system may apply a thermostasis period during which the heating membrane and associated system may cool down to a lower temperature, such as the offset and/or initial surface temperature after which the temperature profile may be applied again in a cyclic manner any number of times. In some embodiments, during the thermostasis period the heating membrane is allowed to passively cool to an equilibrium temperature or the predetermined offset temperature. The effective thermal mass of the system may be selected such that the cooling rate of the heating membrane may provide any desired passive cooling rate. However, in some embodiments, the cooling rate may be selected such that the thermostasis or cooling portion of the temperature profile cycle may be less than or equal to 2 minutes, 1 minute, 30 seconds, 10 seconds, 5 seconds, 3 seconds, 1 seconds and/or any other appropriate time period.

Having described a possible temperature profile generically above, a specific controller for implementing such a control method is described below in regards to FIG. 19B. According to the embodiment of a controller depicted in FIG. 19B, the controller may generate a temperature profile, $F_N(t)$, using PID control during the warmth period. The controller may operate as a closed-loop PID controller designed to deliver a dynamic temperature profile with any desired temperature resolution, including, for example, temperature control resolution within less than or equal to 0.2° C., 0.1° C., and/or neither appropriate temperature resolution. As shown in the figure, a reference temperature for a desired temperature profile (e.g., the temperature the controller commands the heating membrane to apply) during the warmth period may be defined according to the following equation:

$$T_{REF} = T_{OFFSET} + F_N(t)$$

where $T_{OFFSET}$ is a predetermined temperature above the temperature of the adjacent surface $T_{Surface}$. The target temperature profiles can operate using absolute temperatures (i.e., using $T_{Offset}$) or may be defined relative to the initial temperature of the surface (i.e., using $\Delta T_{Offset}$). As shown in FIG. 19A, $F_N(t)$ may be a temperature profile defined relative to $T_{Offset}$. Further as shown by the individual temperature profiles $F_1$, $F_2$, and $F_3$, the temperature profile may take the form of any appropriate function including, for example, linear, power, quadratic, polynomial, rational, exponential, logarithmic, sinusoidal, and/or any other appropriate function, combination or functions, or any other type of profile. In the implementation shown in FIG. 19A, the temperature profile may be formed according to a monotonically increasing function. When $F_N(t)$ is monotonically increasing, the boundary conditions of $F_N(t)$ may be effectively summarized by a duration of warming ($t_{Warm}$), an amplitude of temperature change ($T_{Amp}$) defined as the difference between $T_{Offset}$ and the maximum of $T_{REF}$, as well as the average rate of temperature increase ($r_{AVG}=T_{Amp}/t_{Warm}$).

As shown in FIG. 19A, the thermostasis period allows the haptic actuator to relax (i.e. cool to a desired lower temperature) through thermal dissipation into the environment. Without wishing to be bound by theory, the use of the thermostasis period to change the temperature applied to a surface may allow the haptic actuator to avoid thermal adaptation of the wearer. During the thermostasis period the controller may continue to monitor the temperature of the heating membrane and/or surface, which is closely coupled to the temperature of the skin. However, the controller may not provide power to the heating element of the heating membrane. In the present embodiment, the thermostasis phase lasts until the temperature of the system returns to $T_{Offset}$ or some other appropriate lower temperature. The time for the system to relax ($t_{Equil}$) may be a dynamic property of the entire thermal system that may be determined based on environmental factors as well as the absolute temperatures and duration over which the warmth period is applied. For example, longer duration warmth periods may lead to an increased overall temperature of the underlying surface which may result in longer cooling durations for the system. The controller may also take into account the adaptive behavior of the human body, as the thermal behavior of the human body may significantly change depending on environmental conditions (e.g., radiation, temperature, humidity, airflow) and physiological conditions (e.g., core temperature, initial skin temperature, localized vasodilation, evaporation, etc.). Accordingly, the controller may adjust $t_{Equil}$ to allow the haptic actuator to adapt to changes in the human body and the local environment, which may be of particular benefit in mobile and wearable applications.

A specific system for implementing the above noted control is shown in FIG. 19B. Specifically, a PID loop may include a tuned proportional ($K_P$), integral ($K_I$), and derivative ($K_D$) coefficients, which may be used to control the power provided to the heating membrane through pulse width modulation. As discussed above, one or more temperature sensors may be used monitor the temperature of the membrane and/or surface which may be compared with the reference temperature, $T_{Ref}$, that has been commanded by the controller. The controller may then compute an error value using a difference between the membrane and reference temperatures. The error value may then be used to determine a power and/or command to be output to the heating circuit to provide a desired temperature profile. It should be understood that the specific PID coefficients may be tuned for a particular thermal system.

Without wishing to be bound by theory, the controller and process shown in FIG. 19A-19B may be well suited for a heating membrane with low heat capacity and thermal isolation from an adjoining body. That is, a low heat capacity, thermally-isolated heating membrane may be well suited for efficiently generating dynamic warmth profiles to be applied to an adjacent surface such as skin. Furthermore, during the thermostasis period, the low thermal mass of the membrane enables rapid thermal equilibration of the system without actively cooling the system. In contrast, a membrane with additional heat capacity may increase the energy used to warm the system and, as a result, may prolong the amount of time taken for the system to return to a designated baseline temperature. Accordingly, in some embodiments, the various parameters used by the controller may fall within a predetermined range for efficient operation.

Table 3 details one embodiment for a parameter space for operating a haptic actuator with a controller according to embodiments described herein:

TABLE 1

| Variable | Minimum | Maximum |
|---|---|---|
| $T_{Offset}$ (C.) | 25 | 45 |
| $\Delta T_{Offset}$ | 0 | 20 |
| $t_{Warm}$ (sec) | 1 | 600 |
| $T_{Amp}$ (C.) | 0.1 | 20 |
| $r_{Avg}$ (C./sec) | 0.05 | 2 |
| $t_{Equil}$ (sec) | 1 | 600 |

According to some embodiments, a heating membrane may be in a warmth period until it reaches a predetermined temperature according to a desired temperature profile $F_N(t)$. Similarly, the heating membrane may remain in a cooling period until it reaches a predetermine temperature. In some embodiments, the heating membrane may be heated during the warmth period until it reaches a temperature between 35-40° C. which may provide a warming sensation to the skin of the wearer without feeling hot. In some embodiments, the heating membrane may be allowed to cool during the thermostasis period until the heating membrane reaches a temperature between 30-34° C. Without wishing to be bound by theory, cooling to this temperature range may be sufficient to overcome thermal adaptation of a wearer to the elevated temperatures applied during a warming period. In some embodiments, the cooling period (i.e., thermostasis period) may be longer than the warmth period as it is a passive rather than an active process. However, embodiments in which a duration of the applied warmth periods are shorter than or equal to a duration of the applied cooling periods are also contemplated as the disclosure is not limited in this fashion.

Figure 20A:
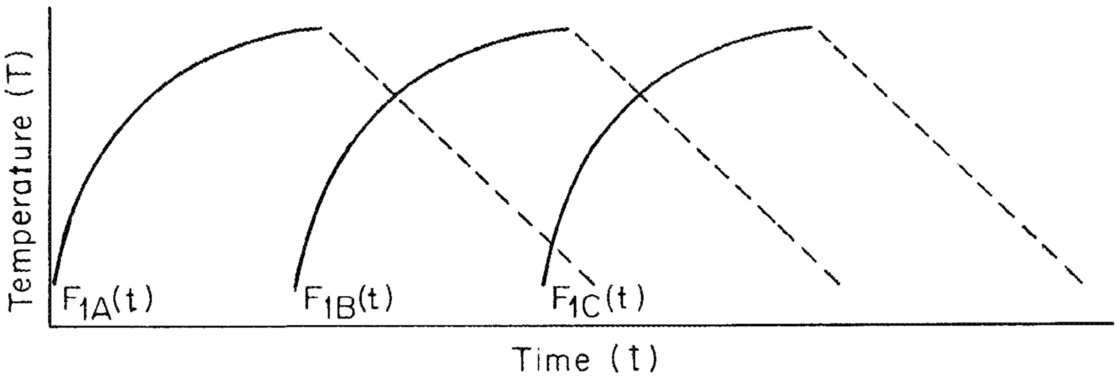
FIG. 20A is a graph showing another embodiment of a method for controlling a temperature of a haptic actuator.
Figure 20B:
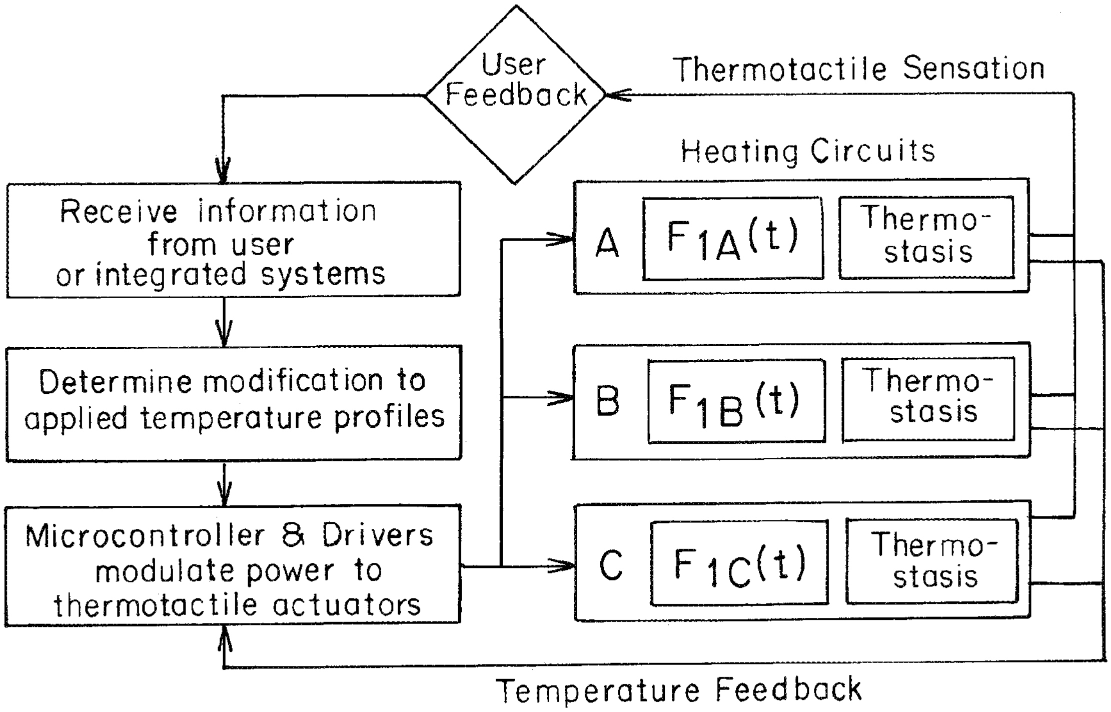
FIG. 20B is a diagram showing another embodiment of a method for controlling a temperature of a haptic actuator.

FIGS. 20A-20B depict a graph showing one method for controlling a haptic actuator including a heating membrane with multiple heating elements and a diagram of a method for controlling the temperature of the haptic actuator, respectively. According to this embodiment, the spatial and temporal dimensions of the temperature profile are defined to create a moving sensation of warmth across three heating elements. As shown in FIG. 20A, temperature profiles are applied to the three different heating elements at different times. More specifically, in the depicted embodiment the heating elements are heated in series, with one element being heated to a reference temperature and turning off for a thermostasis period as a subsequent heating element initiates a warming period. The effect on the adjacent surface is an increasing temperature profile, or wave of heat, that travels across the space occupied by the heating membrane. Of course, the heating elements may have overlapping warmth periods or thermostasis periods, as the present disclosure is not so limited. Similar to the embodiment of FIGS. 19A-19B, the heating elements may be individually heated according to a temperature profile $F_N(t)$, and the temperature profile may be any desirable function. As shown in FIG. 20A, the heating elements may be heated according to a positive, horizontally asymptotic temperature profile.

FIG. 20B is a diagram of one embodiment of a control process for operating a wearable haptic actuator with a heating membrane including three independently-controlled heating elements. The control process shown in FIG. 20B is similar to the process performed by the controller of FIG. 19B, but with three independent modules for controlling each of the independent heating elements. The process may include a feedback loop, where information is received from one or more temperature sensors that measure the temperature of each heating element and/or an associated surface. These temperatures may be used to control each heating element separately. The information from the temperature sensor(s) may be used to determine a control signal applied to the heating elements to produce and control the separate temperature profiles. A controller may implement a control strategy for each heating element as discussed previously above to generate the desired temperature profiles. In some embodiments, it may be desirable to permit a user to provide feedback during application of a temperature profile. This may include requesting increased and/or decreased temperatures and/or rates of temperature change as well as different temperature profile shapes which may provide varying amounts of subjective thermal sensations to the user. The controller may receive this information and determine appropriate modifications to the temperature profiles to be applied by the individual heating elements. The user feedback may be input using any appropriate user interface including both integrated systems such as keyboards, buttons, and touchscreens as well as separately coupled input systems such as a wired and/or wirelessly coupled computing device such as a tablet, smartphone, and/or any other appropriate system.

In some embodiments, a control process for operating a wearable haptic actuator with a heating membrane may include receiving feedback information from one or more sensors disposed on the haptic actuator. For example, the control process may include receiving power information, voltage information, heat flux information, and/or any other suitable information for feedback control. According to embodiments incorporating power information and/or voltage information, a temperature sensor may be omitted from the wearable haptic actuator. That is, the haptic actuator may apply a temperature profile (e.g., $F_N(t)$ in 19A) to an adjacent surface by applying a power and/or voltage profile without receiving feedback temperature information in some embodiments. Such an arrangement may be beneficial to improve the simplicity of the wearable haptic actuator and provide feedback control without a separate temperature sensor. Of course, any suitable sensors in any suitable quantity may be employed to control the haptic actuator by providing one or more information sources as the present disclosure is not so limited.

In some embodiments, a control method similar to that of FIGS. 19A-20B may be used to control an actuator which applies mechanical vibrations through a heating membrane of a haptic actuator. The controller of the actuator may use feedforward or feedback control. For a single actuator, a controller similar to that of FIG. 19B may be used to apply a particular vibration profile to an adjacent surface through the heating membrane. For example, the vibration profile may be applied in pulses and/or using varying frequencies to elicit a particular sensation for the wearer of the haptic actuator. Of course any desirable vibration profile may be applied though the heating membrane, as the present disclosure is not so limited. In some embodiments, two or more actuators associated with separate supports and separate corresponding portions of a heating membrane may be used to apply targeted vibrational profiles in time and space to an adjacent surface using a control process similar to that described above relative to FIG. 20B. Such an arrangement may allow additional sensations based on time and space to be applied to the skin of a wearer of a haptic actuator. In some embodiments, the actuator may be used to pass information to the wearer of the haptic actuator. For example, vibrations may be applied to the skin of a wearer when a message is received on a cooperating device. The vibrations may also be used to pass physiological information such as heart rate or any other useful information to the wearer.

In some embodiments, a controller of the haptic actuator may control both of a heating membrane and vibrational actuator such that thermal and vibrations profiles may be applied to an adjacent surface in a cooperative manner. Without wishing to be bound by theory, certain combinations of vibration and heat may be associated with beneficial sensations to a wearer. For example, social touch which may be physiologically and/or psychologically beneficial may be associated with both vibration and heat. Accordingly, the controller may provide a desirable combination of vibrational and temperature profiles to the adjacent surface. In some embodiments, a vibrational period and a warmth period may at least partially overlap and/or may be applied separately. Of course, the vibrational and temperature profiles may be applied to an adjacent surface by the controller at any suitable time either simultaneously or separately.

Example: Power Consumption Versus Membrane Thermal Capacity

As noted above, the currently disclosed systems may include a heating membrane architecture with a low effective heat capacity. In some embodiments, the conducting material used to provide the desired heating may be non-directional in its heating. Accordingly, to reach a desired temperature profile, the entirety of the membrane, including any associated insulation, interfacial materials, and supports associated with the membrane may be warmed. Without wishing to be bound by theory, the heat capacity of an object describes the amount of energy used to increase the temperature of an object by a given temperature increase, typically provided in Joules/Kelvin (J/K). In some embodiments, during the warmth period, a haptic actuator may generate dynamic temperature profiles with high rates of temperature change, between 0.05° C./s and 2° C./s, 0.1° C./s and 2° C./s, 0.5° C./s and 2° C./s, and/or any other appropriate rate of temperature change in order to generate strong sensations of warmth. Under conditions where dynamic temperature profiles are generated, the heat capacity of the membrane may be equivalent to the power used to generate a given rate of temperature change according to the following ratio:

$$\text{Heat Capacity} = J/K = (J/s)/(K/s) = W/(K/s)$$

where J is joules, s is second, K is degrees Kelvin, and W is Watts.

As one example of the significance of the relationship between heat capacity, power, and temperature change, two insulating layers with differing heat capacities for heating membranes are shown in Table 2 for a silicone layer and a polyimide film used to form heating membranes with a 5

$cm^2$ surface area. Despite having a similar specific heat and density, a roughly ten times increase in thickness in the silicone layer relative to the polyimide film translates to a similar increase in added heat capacity of the heating membrane. Due to the relationship between heat capacity, power, and temperature changes, the silicone membrane used ten times more energy to reach a desired temperature and ten times more power was used to heat the membrane at a desired rate of temperature change. Accordingly, this comparison confirms that providing lower heat capacities and thermally isolating a heating membrane directly relates to a haptic actuator including improved high rate capabilities while providing lower power consumption.

TABLE 2

| Parameter | Polyimide Film | Silicone Rubber |
|---|---|---|
| Heat (J/g * k) | 1.09 | 1.1 |
| Density ($g/cm^3$) | 1.42 | 1.5 |
| Thickness (mm) | 0.0254 | 0.25 |
| Total Thickness (2 sides) (mm) | 0.0508 | 0.5 |
| Total Area ($cm^2$) | 5 | 5 |
| Added Heat Capacity (J/K) | 0.04 | 0.66 |
| Energy to increase temperature of heating membrane by 5 C. (J) | 0.2 | 3.3 |

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. A haptic actuator for transmitting heat and mechanical vibrations to an adjacent surface, the haptic actuator comprising:

a heating membrane;

one or more supports constructed and arranged to transmit mechanical vibrations to the heating membrane;

a body; and an actuator disposed in the body, wherein the actuator is constructed and arranged to apply mechanical vibrations to the one or more supports, wherein the one or more supports physically separate, fix, and support the heating membrane relative to the body, and wherein the one or more supports maintain an air gap within the one or more supports and/or between a plurality of the supports such that there is an air gap between the heating membrane and the body.

2. The haptic actuator of claim 1, wherein the body is substantially thermally isolated from the heating membrane.

3. The haptic actuator of claim 1, wherein the one or more supports are annular.

4. The haptic actuator of claim 1, wherein the heating membrane includes a resistive heating element disposed in a dielectric.

5. The haptic actuator of claim 4, wherein the heating membrane has a heat capacity per unit area in a range from 0.001 J/(K-$cm^2$) to 0.5 J/(K-$cm^2$).

6. The haptic actuator of claim 4, wherein the dielectric includes polyimide.

7. The haptic actuator of claim 4, wherein the heating membrane includes a window formed in the heating membrane.

8. The haptic actuator of claim 7, wherein the haptic actuator further comprises a sensor disposed in and/or aligned with the window, wherein the sensor is constructed and arranged to obtain information about the adjacent surface.

9. The haptic actuator of claim 8, wherein the sensor is flush with an outer surface of the heating membrane.

10. The haptic actuator of claim 8, wherein the sensor is recessed relative to the window.

11. The haptic actuator for claim 8, wherein the sensor is physically separated from the heating membrane.

12. The haptic actuator of claim 1, wherein the heating membrane uses less than 5 Watts during operation.

13. The haptic actuator of claim 12, wherein the heating membrane is constructed to heat at an average rate of temperature change in a range from 0.1 to 2° C./s with a power less than or equal to 5 Watts.

14. The haptic actuator of claim 1, wherein the heating membrane is constructed to cool with a rate of temperature change in a range from 0.1 to 2° C./s when equilibrated to a temperature between 3° and 36° C. under standard atmospheric conditions in an unpowered state.

15. The haptic actuator of claim 1, wherein the heating membrane has transverse surface area in a range from 5 to 10 $cm^2$.

16. The haptic actuator of claim 1, further comprising a controller for controlling the heating membrane and the actuator, wherein the controller is constructed and arranged to switch the heating membrane to a heating state for a first interval and switch the heating membrane to an unpowered cooling state for a second interval, wherein the second interval is longer than or equal to the first interval.

17. The haptic actuator of claim 16, wherein the controller is constructed and arranged to control the actuator to apply the mechanical vibrations in pulses.

18. The haptic actuator of claim 17, wherein the mechanical vibrations are in a range from 20 Hz to 350 Hz.

19. The haptic actuator of claim 17, wherein the controller is configured to apply the mechanical vibration pulses in a range from 30 pulses/min and 120 pulses/min.

20. The haptic actuator of claim 16, wherein the heating membrane includes a temperature sensor constructed and arranged to measure the temperature of the heating membrane.

* * * * *